(12) United States Patent
Kempf et al.

(10) Patent No.: US 11,734,325 B2
(45) Date of Patent: Aug. 22, 2023

(54) DETECTING AND PROCESSING CONCEPTUAL QUERIES

(71) Applicant: Salesforce, Inc., San Francisco, CA (US)

(72) Inventors: Guillaume Jean Mathieu Kempf, Grenoble (FR); Francisco Borges, Voorburg (NL); Marc Brette, Montbonnot-Saint-Martin (FR)

(73) Assignee: Salesforce, Inc., San Francisco, CA (US)

( * ) Notice: Subject to any disclaimer, the term of this patent is extended or adjusted under 35 U.S.C. 154(b) by 460 days.

(21) Appl. No.: 16/399,760

(22) Filed: Apr. 30, 2019

(65) Prior Publication Data
US 2020/0349180 A1    Nov. 5, 2020

(51) Int. Cl.
*G06F 16/00*     (2019.01)
*G06F 16/33*     (2019.01)
*G06F 16/332*    (2019.01)
*G06F 16/31*     (2019.01)
*G06N 3/02*      (2006.01)
*G06Q 30/0202*   (2023.01)
*G06Q 30/0201*   (2023.01)
*G06F 16/36*     (2019.01)
*G06F 40/205*    (2020.01)

(52) U.S. Cl.
CPC ........ *G06F 16/3344* (2019.01); *G06F 16/328* (2019.01); *G06F 16/3329* (2019.01); *G06F 16/367* (2019.01); *G06F 40/205* (2020.01); *G06N 3/02* (2013.01); *G06Q 30/0201* (2013.01); *G06Q 30/0202* (2013.01)

(58) Field of Classification Search
CPC ............... G06F 16/3344; G06F 16/367; G06F 16/3329; G06F 16/328; G06F 40/205; G06N 3/02; G06Q 30/0201; G06Q 30/0202
See application file for complete search history.

(56) References Cited

U.S. PATENT DOCUMENTS

| | | | |
|---|---|---|---|
| 9,087,090 B1 * | 7/2015 | Cormier | G06F 16/86 |
| 9,652,515 B1 * | 5/2017 | Ben-Tzur | G06F 16/2477 |
| 10,303,683 B2 * | 5/2019 | Anderson | G06F 16/285 |
| 2007/0208744 A1 * | 9/2007 | Krishnaprasad | G06F 16/248 |
| 2008/0235199 A1 * | 9/2008 | Li | G06F 16/243 |
| 2017/0017696 A1 * | 1/2017 | Alonso | G06F 16/907 |
| 2017/0228372 A1 * | 8/2017 | Moreno | G06F 16/24522 |

(Continued)

*Primary Examiner* — Dinku W Gebresenbet
(74) *Attorney, Agent, or Firm* — Holland & Hart LLP

(57) ABSTRACT

Methods, systems, and devices supporting detecting and processing conceptual queries are described. A device (e.g., an application server) may receive a search query from a user device. The search query may include one or more parameters. The device may tag the search query using one or more tags associated with the one or more parameters. In some examples, the one or more tags may be determined based on a neural network. The device may determine that the search query is supported as a conceptual query based on a tag of the one or more tags corresponding to a data object stored in a database. The device may then generate a database query in a query language based on the search query, retrieve a set of results for the search query using the database query in the query language, and transmit the set of results to the user device.

18 Claims, 12 Drawing Sheets

(56) References Cited

U.S. PATENT DOCUMENTS

| | | | |
|---|---|---|---|
| 2018/0157747 A1* | 6/2018 | Tiwary | G06F 16/951 |
| 2018/0329993 A1* | 11/2018 | Bedadala | G06F 40/58 |
| 2018/0365567 A1* | 12/2018 | Kolavennu | G06N 20/00 |
| 2019/0065460 A1* | 2/2019 | Xin | G06F 40/295 |
| 2019/0205385 A1* | 7/2019 | Gusakov | G06F 40/169 |
| 2020/0034362 A1* | 1/2020 | Galitsky | G06F 16/24522 |
| 2020/0104733 A1* | 4/2020 | Bart | G06N 3/02 |
| 2020/0125663 A1* | 4/2020 | Batta | G06F 7/14 |
| 2020/0191896 A1* | 6/2020 | Valencia | G01S 1/022 |
| 2020/0265116 A1* | 8/2020 | Chatterjee | G06F 17/16 |
| 2020/0285687 A1* | 9/2020 | Zhang | G06F 16/9574 |
| 2020/0302019 A1* | 9/2020 | Hall | G10L 15/22 |
| 2020/0311800 A1* | 10/2020 | Srinivasan | G06F 16/3344 |
| 2020/0327886 A1* | 10/2020 | Shalaby | G10L 15/18 |

* cited by examiner

DETECTING AND PROCESSING CONCEPTUAL QUERIES

FIELD OF TECHNOLOGY

The present disclosure relates generally to database systems and data processing, and more specifically to detecting and processing conceptual queries.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, CRM solutions, among other solutions, may benefit from data analytics. Applications supporting artificial intelligence enhanced data analytics may increase the scope of data processing and searching by automating much of the data analysis process. In some systems, users may input search requests to retrieve data from a database (e.g., for enhanced data analysis). These search requests may include keyword searches, database queries, or both. A keyword search may include a list of words or characters to search for in the database, while a database query may be input in a specific query format and may include data values or parameters to search for in the database. However, these querying techniques may have limited capabilities to process a search request that includes data values or information intended for querying a database that is not in a recognized or supported query format.

DETAILED DESCRIPTION

Figure 1:
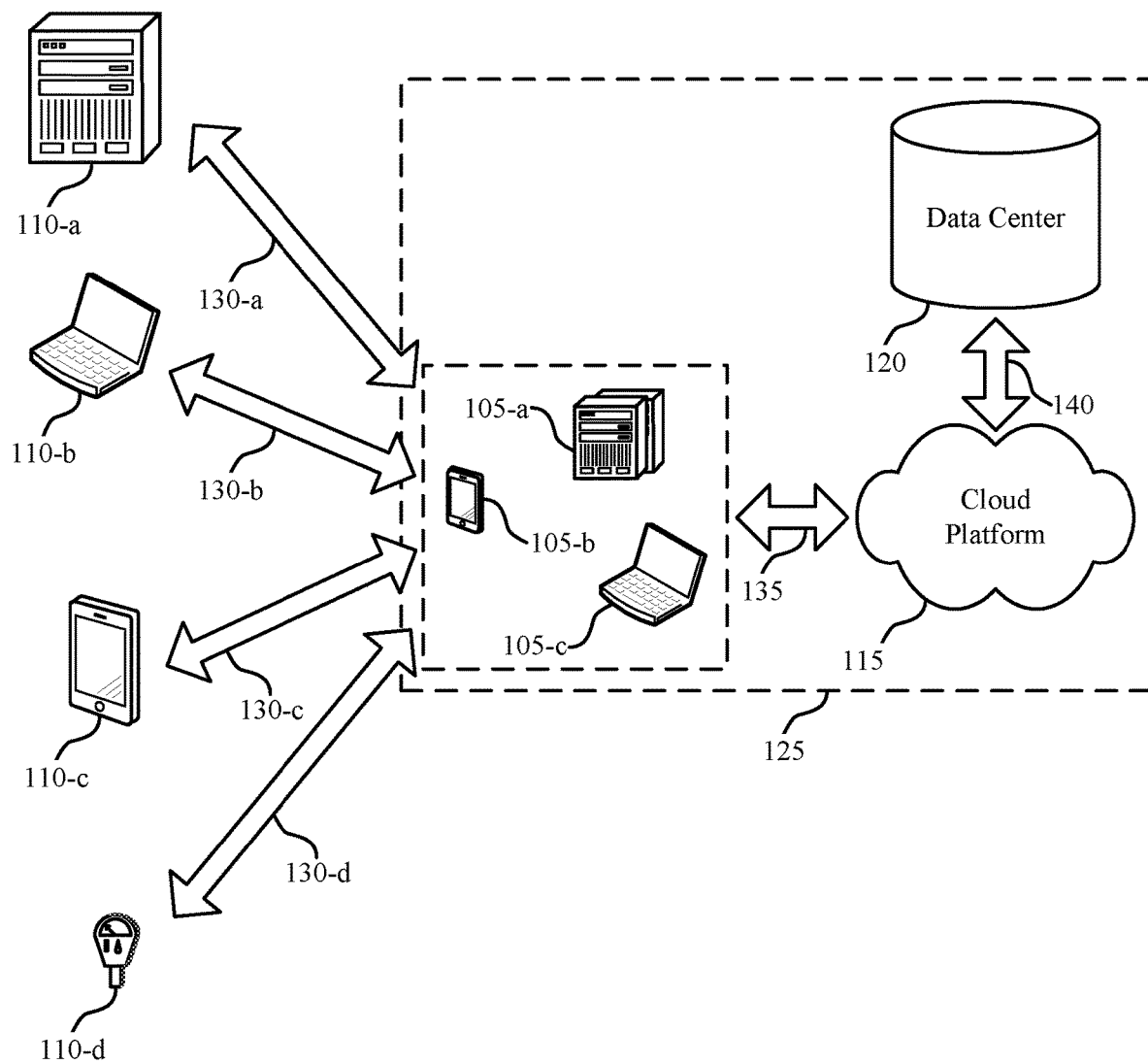
FIG. 1 illustrates an example of a system for cloud computing that supports detecting and processing conceptual queries in accordance with aspects of the present disclosure.

Some systems (e.g., artificial intelligence systems supporting customer relationship management (CRM) and one or more datasets) may support a user-friendly, interactive data analytics application. Such an application may receive a search query (e.g., a search request) and may retrieve a set of results (including one or more results) in response to the search query. As one example, a user may input a search query using a data analytics application running on a user device. In some cases, the data analytics application on the user device may transmit the request to a server (such as an application server). The server, upon receiving the search query, may perform a keyword search to return one or more results in response to the search query. A conventional system may not consider the context associated with a search query if the search query is not input in a recognized query format. That is, upon receiving a search query, a system may parse a received search query to identify one or more keywords. Based on identifying the keywords, the system may search a database for the keywords and may return results matching the identified keywords. However, such systems may lack the ability to predict and associate a meaning with the received search query (e.g., beyond a classic keyword search). Specifically, because some systems may not consider a context related to a received query if the query is not in a recognized query format, the systems may perform an inefficient database search and may return information related to keywords as opposed to query parameters or the context of the query.

In contrast, some database systems may implement a robust artificial intelligence model for search queries that supports detecting and processing conceptual queries. According to one or more aspects of the present disclosure, a device (e.g., a user device, server, server cluster, database, etc.) may perform any combination of the following techniques and procedures to detect and process conceptual queries. Specifically, the device may implement a series of algorithms that can evaluate a received search query to identify a context associated with the search query. For example, the artificial intelligence system may receive a request (such as a request from a user using an analytics application) to run a search query using an artificial intelligence model. The artificial intelligence system may receive the search query included in the request and, upon receiving the search query, the artificial intelligence system may apply an artificial intelligence model (e.g., a neural network) and evaluate artificial intelligence model results in an iterative fashion. For example, the artificial intelligence system in the present disclosure may enable identification of various portions of a search query and detection of a user intent based on the portions of the search query.

According to one or more aspects of the present disclosure, upon receiving a search query from a user, the artificial intelligence model (i.e., the artificial intelligence model hosted on an application server) may encode the search query on a per-word level and a per-character level. In some cases, the artificial intelligence system may determine a first input array based on encoding the search query on a per-word level and a second input array based on encoding the search query on a per-character level. According to one or more aspects, the artificial intelligence system may encode the search query using one or more numerical values for each word and each character included in the search query. After encoding, the artificial intelligence system may use a Named Entity Recognition model to tag the query using one or more tags. The tags may support querying the database based on specific data values or information stored in the database, as opposed to performing a classic keyword search.

In some cases, the one or more tags may include different entities, scopes, Boolean fields, and picklist values. In some examples, the search query may be tagged using an Inside Outside Beginning (IOB) format and using different labels. In an IOB format, words (or sets of characters) may be identified as the beginning (B) of a token, the inside (I) of a token, or outside (O) the known set of tokens. Tokens may correspond to tags for tagging the search query. In some cases, the labels may include person (PER), location (LOC), organization (ORG), etc. In one example, a user may type "Company A converted leads" into a search bar of a user interface, and this search query "Company A converted leads" may be tagged as B-ORG I-ORG B-UDD_CONVERTED B-UDD_LEAD. Further, the tags may be transformed and grouped. Continuing the previous example, the tags for the query "Company A converted leads" may be grouped as [("Company A": COMPANY), ("converted", UDD_FIELD_CONVERTED), "leads", LEAD_ENTITY_NAME)]. In some cases, the artificial intelligence model may determine whether the search query includes a name of a person or a company. Upon identifying a name of a person or a company in the search query, the artificial intelligence model may resolve the query into a unique identifier relevant to the user and the given portion of the query (such as a portion of the query including the name of a person or a company). In the example query "Company A converted leads," the artificial intelligence system may determine that "Company A" is a name of an account, and may be resolved to a unique identifier (ID) "001xxxxxxxxxx."

Based on the tagging information, the artificial intelligence system may be configured to determine whether the search query supports conversion to a "conceptual" query. A conceptual query may be a search request that is not written in a query format but includes information for filtering based on specific data objects or data fields in a database. In some cases, the system may determine whether a search query is supported as a conceptual query based on a set of rules (e.g., whether the query indicates a data object to retrieve from a database). If the conceptual query is supported, the artificial intelligence system may transform the received search query (e.g., a search request not in a query format) into a database query (e.g., in a query format, such as a structured query language (SQL) query, an object query language query, etc.) using the identified tags. The system may use this constructed database query to retrieve data records from a database and transmit them to the requestor. Alternatively, if the artificial intelligence system determines that the conceptual query is not supported, then the artificial intelligence system may fall back to performing a keyword search based on the received search query and may transmit the result to the requestor.

Aspects of the disclosure are initially described in the context of an environment supporting an on-demand database service. Additional aspects are described with reference to querying procedures, systems that support detecting and processing conceptual queries, and a process flow. Aspects of the disclosure are further illustrated by and described with reference to apparatus diagrams, system diagrams, and flowcharts that relate to detecting and processing conceptual queries.

FIG. 1 illustrates an example of a system 100 for cloud computing that supports detecting and processing conceptual queries in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A device (e.g., any component of subsystem 125, such as a cloud client 105, a server or server cluster associated with the cloud platform 115 or data center 120, etc.) may perform any combination of the following techniques and procedures to detect and process conceptual queries using artificial intelligence models. For example, the device (e.g., a user device, server, server cluster, database, etc.) may enable a user to express a conceptual query for an improved search experience. Conceptual queries may support object-level filters, related lists (e.g., linked to a particular user, tenant, etc.), or any other processes supported by query languages. Using an artificial intelligence system (e.g., a neural network supporting named entity recognition), the device may support user intent detection, query understanding, and conceptual query identification. The device may generate a query based on an identified conceptual query that supports enterprise search (e.g., in a multi-tenant database system).

The device may receive a search query including one or more parameters, where the search query may be a String of characters, words, sentences, etc. input by a user. In some cases, the device may receive a request to run the search query using an artificial intelligence model. Upon receiving the search query (e.g., at query time), the device may parse the search query. For example, the device may parse the search query to identify one or more words included in the search query. Additionally or alternatively, the device may parse the search query to identify one or more characters included in the search query. The device may determine an input array based on parsing the search query. In some cases, the device may input the input array into a neural network and may receive an output in response to the input array (e.g., based on the layers and weights of the neural network). The device may then determine one or more tags associated with the one or more parameters included in the search query. In some cases, the device may tag the search query using the tags determined based on the output of the neural network. The device may determine whether the search query is supported as a conceptual query based on the tags. For instance, the device may determine that the search query is supported as a conceptual query based on a tag of the one or more tags corresponding to a data object stored in a database. If the device determines that the search query is supported as a conceptual query, then the device may generate a database query in a query language based on the search query. That is, the device may convert the search query into a standardized query language and may transmit the database query (i.e., the database query in a standardized query language) to a database. The device may retrieve a set of results in response to the database query and may transmit the set of results to the requestor (e.g., a user device for display, a server for further processing, etc.).

In conventional systems, search handlers may be unable to identify conceptual queries or may otherwise have limited capabilities for identifying or processing conceptual queries. Conventional systems for query handling may be unable to identify any context associated with a search query that is not in an identifiable query language. That is, existing systems do not have the capability to identify a context associated with keywords included in a search query. Existing search handlers may be configured to receive a search query (such as a set of characters or words), and upon receiving the search query, existing search handlers may perform a keyword search to return one or more results in response to the search query. According to one or more examples, existing systems may use a keyword search based on a text search platform or application to retrieve results in response to a search query. Current systems are configured to create indexes based on tokens (such as tokens retrieved from documents). Upon receiving a search query, existing search handlers may use a keyword search to match one or more terms from the search query with the tokens. An existing system (such as a system employing the Apache Solr™ search platform, the Elasticsearch™ platform, etc.) may parse a received search query to identify one or more keywords. Based on identifying the keywords, a conventional system may search for the keywords (or a combination of keywords) in database records and may return results matching the identified keywords. That is, existing search handlers may identify results of a search query by performing a keyword search without any regard to the context (e.g., filtering based on any specific data object or data field values) of the search query. Thus, existing systems lack the ability to predict and associate a meaning with a search query. Specifically, current search handlers do not possess the ability to predict and associate a meaning to each portion of a given search query based on a context related to the search query. As an example, upon receiving a search query "my open cases," existing search handlers may be configured to perform a keyword search and return documents or data objects that include the words "my," "open," "cases," or some combination of these words or the corresponding characters. A multi-tenant system may include multiple clients, and each client may use a different knowledge domain (e.g., underlying relationships or information associated with the client but not learned using the client's data) and may customize a client-specific CRM platform. The existing search handlers may fail to build a solution to interpret a user's search queries and convert them to conceptual queries.

In contrast, the system 100 implements procedures and techniques for detecting and processing conceptual queries. According to one or more aspects of the present disclosure, the system 100 may process conceptual queries using an artificial intelligence model. Specifically, the system 100 may use an artificial intelligence model (e.g., using a neural network) to determine an intent of a search query. For example, the system 100 in the present disclosure may enable identification of different portions of a search query and detection of a user intent based on the portions of the search query. The system 100 may receive a search query, parse the search query, and determine one or more tags associated with the search query. As one example, the system 100 may receive a search query "my open cases" from a user. Upon receiving the search query "my open cases," the system 100 may parse the received query to identify one or more words included in the search query and one or more characters included in the search query. For example, the system 100 may identify the words "my," "open," and "cases" from the search query. Additionally or alternatively, the system 100 may identify the characters "m," "y," "o," "p," "e," "n," "c," "a," "s," "e," and "s" from the search query. The system 100 may then identify a numerical value associated with each of the one or more words, and a numerical value associated with each of the one or more characters. In some examples, the system 100 may determine a first input array for the one or more words, and a second input array for the one or more characters. The system 100 may input the arrays (i.e., the first array and the second array) into a neural network and may receive one or more tags associated with the search query as an output. For example, based on the input arrays, the neural network may output tags indicating that "my" refers to the scope of the query, "open" corresponds to a data field "isOpen," and "cases" corresponds to a data object type stored in a database.

In some cases, the system 100 may tag the search query using the one or more tags and may determine whether the search query is supported as a conceptual query. For example, the system 100 may determine that the search query is supported as a conceptual query based on the one or more tags (e.g., based on the tags including a reference to a data object type to retrieve from a database). In such cases, the system 100 may generate a database query in a query language based on the search query. That is, the system 100 may convert the search query into a database query. Referring to the example of the search query "my open cases," the system 100 may construct a database query in a recognized query language to retrieve a list of cases owned by the user that are in an open state. The database may process the database query and return a set of cases based on the query parameters (e.g., where the "isOpen" data field is set to true and an owner of the case data object is associated with the user's ID). In this way, the results for the search query "my open cases" from a first user may be different from the results for the search query "my open cases" from a second user (since the cases associated with the first user are different from the cases associated with the second user). Thus the systems and methods described in the present disclosure provides for detecting context associated with a search query and enables a user to receive targeted results in response to a search query.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
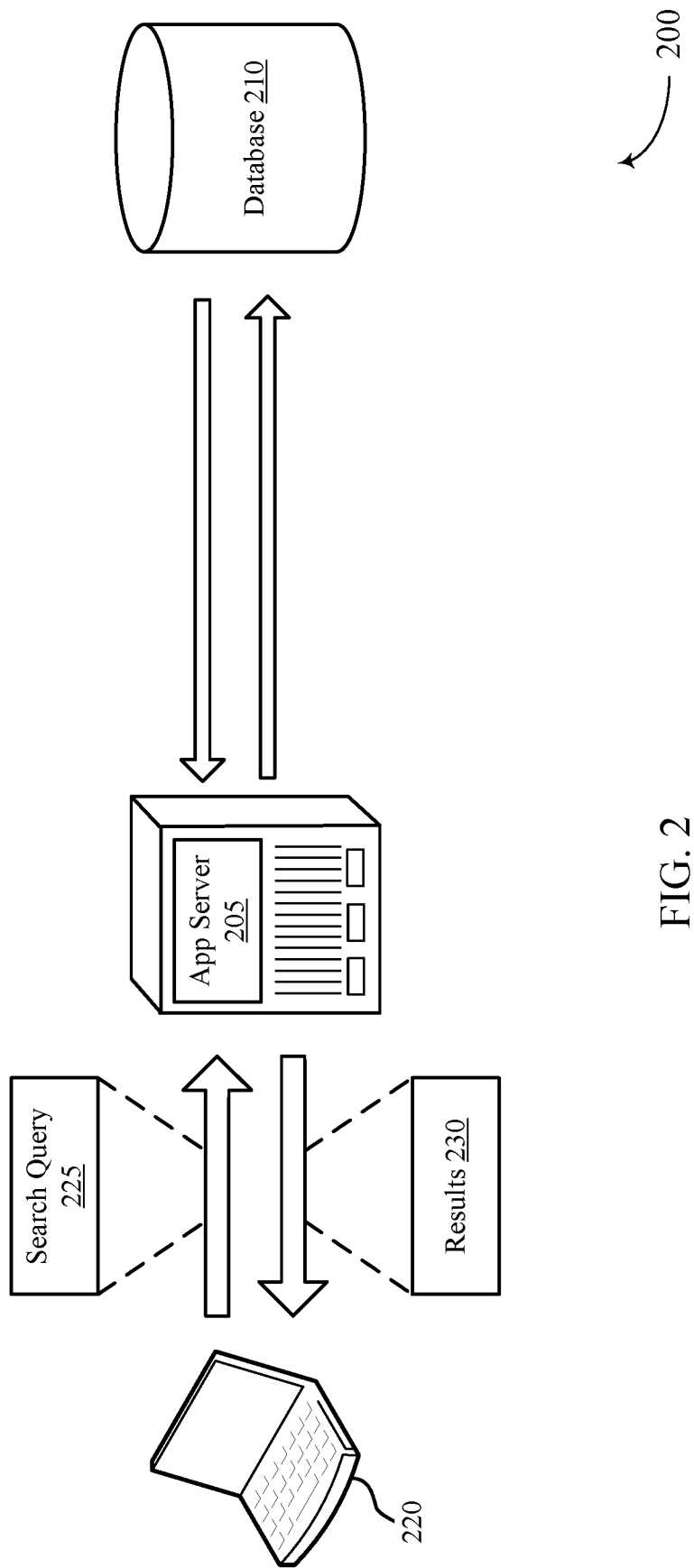
FIG. 2 illustrates an example of a system that supports detecting and processing conceptual queries in accordance with aspects of the present disclosure.

FIG. 2 illustrates an example of a system 200 that supports detecting and processing conceptual queries in accordance with aspects of the present disclosure. The system 200 may include an application server 205 (e.g., a device), a database 210, and a user device 220. In some cases, the functions performed by the application server 205 may instead be performed by a component of the database 210 or the user device 220. The user device 220 may support an application for data analytics. Specifically, the user device 220 in combination with the application server 205 may support an application that detects and processes conceptual queries using one or more artificial intelligence models. A user operating the user device 220 may interact with the application to run an artificial intelligence model (such as a Named Entity Recognition model) at the application server 205, where the application server 205 may identify a set of results 230 based on the artificial intelligence model and may provide the set of results 230 to the user device 220. For example, the application server 205 may identify the set of results 230 in response to receiving a search query 225 from the user device 220 and may transmit the set of results 230 to the user device 220.

The user device 220 may display an interactive interface for receiving a search query 225. The user device 220 may receive a search query 225 including one or more parameters that is input by a user (e.g., into a search bar or search field of the user interface). In some cases, this interface may run as a webpage within a web browser (e.g., as a software as a service (SaaS) product). In other cases, this interface may be part of an application downloaded onto the user device 220. A user operating the user device 220 may input information (such as information related to the search query 225) into the user interface to specify aspects of a request to run a search query 225 using an underlying artificial intelligence model. As one example, the user device 220 hosting an application for running an artificial intelligence system may be implemented in a multi-tenant system. In a multi-tenant system, tenants may use different knowledge domains and customize their CRM platforms based on tenant-specific preferences or use cases. For example, a client in a multi-tenant system may submit a search query 225 to receive a list of data objects based on an intent of the search query 225. The artificial intelligence system in the present disclosure may enable identification of various portions of a search query 225 and detection of a user intent based on the portions of the search query 225. In some cases, the artificial intelligence system may determine the intent of a search query 225 based on a knowledge domain associated with a user submitting the search query 225.

In some cases, a user (such as a client associated with a particular knowledge domain in a multi-tenant system) may be associated with a user credential or user ID, and the user may log on to the user device 220 using the user credential. In some cases, the user credential may be associated with an identifier of the knowledge domain. For example, if a user is part of a specific organization (such as an organization associated with a knowledge domain in a multi-tenant system), the application server 205 may identify the organization using the user credential, and may run the artificial intelligence model on the database 210 associated with that organization. In some cases, the database 210 associated with an organization may include information related to tags and other parameters associated with a search query 225. The application server 205 may utilize the tags and other parameters from the database 210 to detect a context associated with a received search query 225. In this way, the application server 205 may provide a solution to interpret a user's searches and convert the searches to conceptual queries instead of performing keyword searches.

Based on the user input received from a user operating user device 220 (such as a search query including one or more parameters), the application server 205 may identify a context associated with the search query 225. The application server 205 may identify a context associated with the search query 225 using the user credential identified from the search query 225 (or input by the user). In some cases, the application server 205 may use the user credential to identify a data set from the database 210 based on the context. For example, using the context, the application server 205 may identify a knowledge domain associated with the user. Additionally, upon receiving the user input from a user operating user device 220 (such as a search query including one or more parameters), the application server 205 may identify one or more parameters. In some cases, the application server 205 may parse the search query 225 based on the one or more parameters. As one example, the application server 205 may receive a search query 225 "my open cases" from a user. The application server 205 may parse the search query 225 to identify one or more words from the search query 225. Additionally or alternatively, the application server 205 may parse the search query 225 to identify one or more characters from the search query 225. For the example search query 225 "my open cases," the application server 205 may parse the search query 225 to identify the words "my," "open," and "cases." Additionally or alternatively, the application server 205 may parse the search query 225 to identify the characters "m," "y," "o," "p," "e," "n," "c," "a," "s," "e," and "s." Using one or more aspects of the present disclosure, the application server 205 may utilize the relevant data set from the database 210 to convert the search query 225 into a database query that can return a set of results for all cases owned by the user that are in an open state, rather than performing a keyword search for "my," "open," "cases," or some combination of these terms.

The application server 205 may tag the search query 225 using one or more tags associated with the one or more parameters of the search query 225. In some cases, the one or more tags may be determined based on a neural network (such as a Named Entity Recognition system). In some cases, the application server 205 may input an array to the Named Entity Recognition system based on parsing the search query 225. With respect to the prior example search query 225 "my open cases," the application server 205 may input an array including the words "my," "open," and "cases" to a Named Entity Recognition system. Additionally or alternatively, the application server 205 may input an array including the characters "m," "y," "o," "p," "e," "n," "c," "a," "s," "e," and "s" to a Named Entity Recognition system. The application server 205 may receive an output from the Named Entity Recognition system and may determine the one or more tags based on the output of the neural network (such as the output of the Named Entity Recognition system). The tags may include a person, a location, an organization, a time or a combination thereof. In one example, the application server 205 may tag the search query 225 using the determined tags. In some cases, the neural network—and, correspondingly, the determined tags—may be based on the relevant data set identified in the database 210.

Upon tagging the search query 225 using one or more tags associated with the one or more parameters, the application server 205 may determine whether the search query is supported as a conceptual query. In some example, the application server 205 may determine that the search query is supported as a conceptual query based on a tag of the one or more tags corresponding to a data object or data object type stored in the database 210. For example, a conceptual query may be supported if resolving a search query 225 to a database query (e.g., rather than performing a keyword search) can return accurate results for the search query 225. If it is determined that the search query is supported as a conceptual query, the application server 205 may generate a database query in a query language based on the search query 225. In some examples, the application server 205 may generate the database query in a predetermined query language (such as a standardized query language). In some examples, generating the database query is based on the one or more tags and based on determining that the search query is supported as the conceptual query. That is, upon determining that the search query 225 can be supported as a conceptual query, the application server 205 may determine metadata associated with the search query 225 (e.g., based on the one or more tags associated with the search query 225) and may query the database 210 based on the metadata. For example, the application server 205 may generate the database query based on the determined metadata.

In some examples, the application server 205 may retrieve a set of results for the search query 225 from the database 210. That is, the application server 205 may use the database query in the query language (such as a database query in a standardized query language) to query the database 210 and may receive a set of results in response to the query. In an alternative example, if the application server 205 determines that the search query 225 is not supported as a conceptual query (e.g., if the search query 225 does not include a parameter indicating information that can be retrieved using a database query), then the application server 205 may perform a keyword search. Referring back to the example search query 225 "my open cases," the application server 205 may perform a keyword search for "my," "open," "cases," or some combination of these terms (e.g., if the application server 205 determines that the relevant data set does not include any case data objects and, accordingly, the search query 225 "my open cases," is not supported as a conceptual query). Upon receiving the set of results, the application server 205 may send the set of results 230 to the user device 220 for display in a user interface. This may allow a user to receive the results 230 in response to a search query 225, where the set of results 230 are associated with a context of the search query 225. In some cases, the user device 220 may modify the set of results 230 for display (e.g., displaying a subset of the results, displaying certain parameters or fields, etc.).

Figure 3:
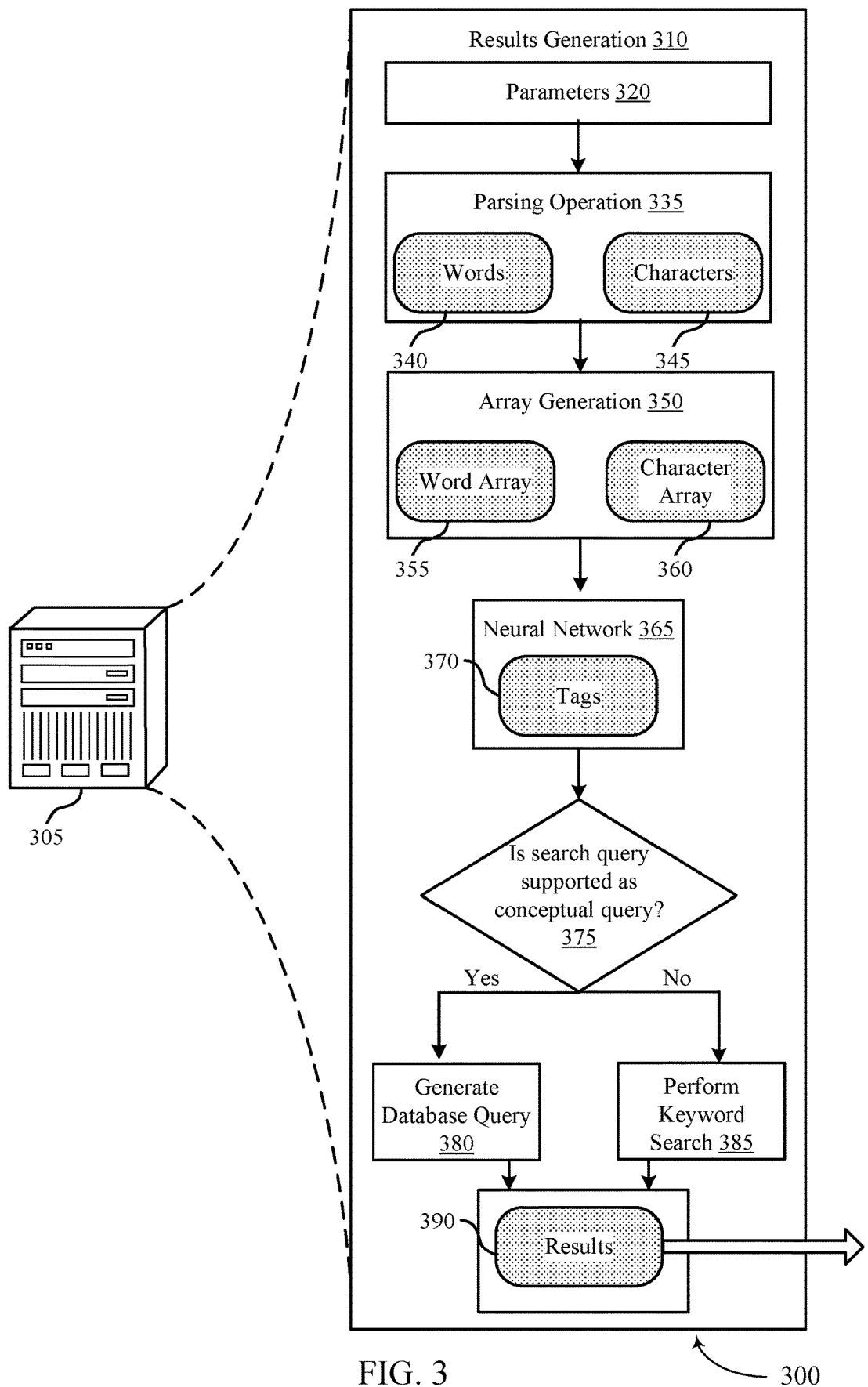
FIG. 3 illustrates an example of a querying procedure that supports detecting and processing conceptual queries in accordance with aspects of the present disclosure.

FIG. 3 illustrates an example of a querying procedure 300 that supports detecting and processing conceptual queries in accordance with aspects of the present disclosure. The querying procedure 300 may be performed by a device 305, such as a server (e.g., an application server, a database server, a server cluster, a virtual machine, a container, a component of another device, etc.). Although not shown in FIG. 3, the querying procedure 300 may be performed by a user device, a data store, or some combination of these or similar devices. In some cases, the device 305 may be a component of a subsystem 125 as described with reference to FIG. 1. The device 305 may perform results generation 310 to generate results 390 based on a received search query (not shown). For example, using a number of techniques, the device 305 may run an artificial intelligence model on a received search query and may determine a set of results 390 from the search query to provide to a user. In some cases, a device 305 may implement all of the techniques described herein to perform results generation 310 while in other cases, the device 305 may implement a subset of the described techniques or may implement additional techniques to support results generation 310 in relation to an intent of the search query.

In some systems, search handlers may be unable to identify conceptual queries. That is, certain systems may not have the capability to identify a context associated with a search query. Upon receiving a search query, if the search query is not input in an identifiable query language or format, these search handlers may perform a keyword search to return one or more results in response to the search query. In one example, search handlers may use a keyword search to identify results of a search query. A system may parse a received search query to identify one or more keywords. Based on identifying the keywords, the system may search for the keywords (or a combination of keywords) and may return results matching the identified keywords. For example, the system may identify a search index, retrieve documents or data based on the keywords, the search index, or both (e.g., documents containing frequent uses of the keywords), determine scores for the results based on the search index, rank the results based on the scores, and return the results according to the ranking. However, such systems may lack the ability to predict and associate a meaning with a search query. Specifically, these search handlers may not possess the ability to predict and associate a meaning to each portion of a given search query based on a context related to the search query. As such, the results may not match what the user intended to retrieve based on the language used in the search query.

In contrast, the device 305 may implement an artificial intelligence model (e.g., using a neural network) to determine an intent of a search query for results generation 310. For example, the artificial intelligence system in the present disclosure may enable identification of different portions of a search query and detection of a user intent based on the portions of the search query. As one example, upon receiving a search query "my open cases" from a user, the artificial intelligence system may convert the search query into a database query that can return a list of all cases owned by the user that are in an open state. For example, the results for the search query "my open cases" from a first user may be different from the results for the search query "my open cases" from a second user (since the cases associated with the first user are different from the cases associated with the second user, and the search is not performed simply based on the keywords "my," "open," and "cases"). As another example, a query "Company A converted leads" may return a list of all leads related to the "Company A" account that are in a converted state. This enables a user to receive targeted results in response to a search query, thereby reducing a number of false hits in response to the search query.

The device 305 may support computer aided data science, which may be performed by an artificial intelligence-enhanced data analytics framework. In a first example, the device 305 may run an application for artificial intelligence-enhanced data analytics (e.g., running a search operation in a webpage of a web browser). In a second example, the device 305 may perform backend processing for artificial intelligence-enhanced data analytics. Artificial intelligence-enhanced data analytics may support user interaction via a user interface. In some cases, a user may guide or provide inputs for a data analysis procedure, and the device 305 may perform the analytics, determine findings, and/or display results based on retrieved data (such as a set of results 390). These results 390 may be targeted results in response to a search query based on a context associated with the search query.

The device 305 may be an example of a general analysis machine and, as such, may perform data analytics and results generation 310 based on receiving a search query from a user. The device 305 may receive a search query including one or more parameters. In some examples, the search query may be one or more search terms input by a user (e.g., in a user interface, such as a web interface of a user device). In some examples, the device 305 may receive the request from a user device (such as a user device separate from device 305). The user device may receive the request on an interactive interface. This interface may run as a webpage within a web browser, as part of an application downloaded onto the user device, or as any other interface supported by the user device. In some cases, the user operating the user device may be a user of a multi-tenant system. The user may submit a search query while using a knowledge domain associated with the user (such as while logged into a system associated with the knowledge domain). Upon receiving the search query, the user device may forward the search query to the device 305 (e.g., an application server) for backend processing. Upon receiving the search query, the device 305 may identify one or more parameters 320 (e.g., tokens) included in the search query. For example, the one or more parameters 320 may include one or more portions of the search query. In the example search query "my open cases," the one or more parameters may be "my," "open," and "cases." Additionally, in an example search query "my won opp last month," the one or more parameters may be "my," "won," "opp," and "last month." In some cases, the device 305 may identify a context associated with the search query and may run the artificial intelligence model based on the context. That is, the device 305 may identify a user identification associated with the user submitting the search query. The device 305 may then run the search query based on the identified context associated with the search query.

According to one or more aspects of the present disclosure, the device 305 may parse the received search query using a parsing operation 335. In some cases, the device 305 may parse the search query based on the one or more parameters. In one example, the device 305 may parse the search query to identify one or more words 340 from the search query. Additionally or alternatively, the device 305 may parse the search query to identify one or more characters 345 from the search query. Referring to the example search query "my open cases," the device 305 may parse the search query to identify the one or more words 340 "my," "open," and "cases." Additionally or alternatively, the device 305 may parse the search query to identify the one or more characters 345 "m," "y," "o," "p," "e," "n," "c," "a," "s," "e," and "s." In some cases, the character parsing may include identifying spaces between words (or sets of non-space characters). Additionally or alternatively, the parsing operation 335 may involve parsing based on sets of words (e.g., pairs of words, groupings of a number of consecutive words, etc.).

As described in the example of FIG. 3, the device 305 may determine one or more input arrays for a machine learning model (e.g., a neural network) based on parsing the search query. For example, the device 305 may determine an input array by performing an array generation operation 350. In some cases, the device 305 may determine one or more numerical values associated with the one or more words 340. For instance, the device 305 may determine one or more numerical values associated with the one or more words 340 "my," "open," and "cases," for the search query "my open cases." The device 305 may receive (or query) the numerical values from a database (not shown). Additionally or alternatively, the device 305 may determine the numerical values based on one or more lookup tables, equations, mappings, etc. In some cases, the device 305 may determine an input array based on parsing the search query. That is, the device 305 may determine a word array 355 including the one or more numerical values associated with the one or more words 340 "my," "open," and "cases," for the search query "my open cases." Additionally or alternatively, the device 305 may determine one or more numerical values associated with the one or more characters 345. For instance, the device 305 may determine one or more numerical values associated with the one or more characters 345 "m," "y," "o," "p," "e," "n," "c," "a," "s," "e," and "s," for the search query "my open cases." In some cases, the device 305 may determine an input array based on parsing the search query to identify the one or more characters 345. For example, the device 305 may determine a character array 360 including the one or more numerical values associated with the one or more characters 345 "m," "y," "o," "p," "e," "n," "c," "a," "s," "e," and "s," for the search query "my open cases."

As one example, the word array 355 including the one or more numerical values associated with the one or more words 340 "my," "open," and "cases" may be [15, 2, 23, 0, . . . , 0]. Additionally or alternatively, the character array 360 including the one or more numerical values associated with the one or more characters 345 "m," "y," "o," "p," "e," "n," "c," "a," "s," "e," and "s" may be [57, 2, 25, 41, 7, 41, 50, 11, 13, 42, 15, 0, . . . , 0]. The same word or character may or may not correspond to the same numerical value (e.g., based on the other words or characters in the array, based on a positioning of the word or character in the array, etc.). In some cases, the length of the word array 355, the character array 360, or both may correspond to the number of nodes in an input layer of the neural network. This conversion of words or characters to numerical arrays may be performed using natural language processing (NLP).

In some cases, the device 305 may input an input array into a neural network 365 (such as a Named Entity Recognition system or model). For example, the device 305 may input the word array 355 and/or the character array 360 into the neural network 365. To input an array into the neural network 365, the numerical values of the array may be input sequentially into the nodes of an input layer for the neural network 365. These numerical values may pass through one or more hidden layers of the neural network 365 (where different weights may be applied to one or more numerical values at each layer, resulting in intermediate node values hidden in the neural network 365) until reaching an output layer of the neural network 365. As described in the example of FIG. 2, the device 305 may determine one or more tags 370 based on the output of the neural network 365. For example, each node of the output layer may correspond to a tag, and the numerical values resulting from the neural network operations may indicate probabilities that the corresponding tags are relevant to the input array. The neural network 365 may identify a set of tags 370 corresponding to the search query parameters 320 based on comparing the resulting probabilities to one or more probability thresholds (e.g., if a given output node contains a probability value greater than or equal to a static or dynamic probability threshold, the device 305 may tag the search query with the tag corresponding to that output node).

In some cases, the one or more tags 370 may include different entities, scopes, Boolean fields, picklist values, or some combination thereof. In some cases, the one or more tags 370 may include a person, a location, an organization, a time, or a combination of these or other classic tagging concepts. In some examples, the entities may include different data objects stored in a database, such as accounts, cases, contacts, leads, opportunities, etc. Additionally or alternatively, the one or more tags 370 may include scopes (e.g., filters) such as my, all, recent, etc. Additionally or alternatively, the one or more tags 370 may include Boolean fields (e.g., corresponding to data field values or metadata of data objects) such as isOpen, isClosed, isWon, isLost, isConverted, isUnconverted, etc. Additionally or alternatively, the one or more tags 370 may include picklist values (e.g., corresponding to data field values or metadata of data objects) such as In Progress, Prospecting, etc. In one example, the device 305 may tag the search query using the one or more tags 370 associated with the one or more parameters 320, where the one or more tags 370 are determined based on the neural network 365. In the example search query "my open cases," the device 305 may tag the parameter "my" as a scope (e.g., indicating filtering for data objects owned by the user sending the search query), the parameter "open" as a Boolean field (e.g., indicating filtering for data objects with the data field "isOpen" equal to "true"), and the parameter "cases" as an entity (e.g., indicating retrieving Case data objects from the database). As such, the tags may support retrieving Case data objects that are open and owned by the user inputting the search query, where a standard keyword search may retrieve any files or data objects including the words "my," "open," and/or "cases." In this way, the tagging may support more robust querying for particular types of data from a database. In another example, the device 305 may tag a search query "my won opp last month," using the parameter "my" as a scope, the parameter "won" as a Boolean field (such as Opp.IsWon==true), the parameter "opp" as an entity, and the parameter "last month" as a time period.

In some examples, the device 305 may tag the search query using the one or more tags 370 according to an IOB format. In some cases, the device 305 may determine that a first tag and a second tag are associated with a parameter (such as a parameter from the one or more parameters 320) included in the search query, and may combine the first tag and the second tag associated with the parameter. In some cases, the device 305 may tag the search query based on combining the first tag and the second tag. In one example, the device 305 may determine that at least one parameter from the one or more parameters 320 includes at least one of a name of a person, a name of an organization, or a combination thereof. In such cases, the device 305 may resolve the at least one parameter to a unique identifier associated with at least one of the person, the organization, or a combination thereof. For example, upon receiving a search query "Company A won opp," the device 305 may identify that Company A is a name of an account. The device 305 may resolve the term Company A to a unique identifier for the account named "Company A." In some cases, the device 305 may additionally or alternatively identify a set of data object types stored in the database based on a configured list of data object types supported by the database (not shown). The device 305 may determine potential tags of the one or more tags 370 corresponding to the data object stored in the database based on identifying the set of data object types. In some examples, the device 305 may retrieve the information indicating the set of data object types supported by the database. For example, the device 305 may transmit a retrieval request to a database and may retrieve the information in response to the retrieval request. In other examples, the device 305 may be configured with the set of data object types supported by the database.

Upon determining the one or more tags 370, the device 305 may determine, at 375, whether the search query 305 is supported as a conceptual query based on a tag of the one or more tags corresponding to a data object stored in a database. For example, the device 305 may determine whether the search query is supported as a conceptual query based on a set of rules (e.g., whether the query indicates a data object to retrieve from a database). A conceptual query may support transformation from the search query to a database query that retrieves specific data objects from the database. If the search query does not indicate a type of data to retrieve from the database, the search query may not support construction of a database query, and as such may not be handled as a conceptual query. If, at 375, the device 305 determines that the search query is supported as a conceptual query, the device 305 may generate 380 a database query in a query language based on the search query (e.g., where the database query is an example of a SQL query, a contextual query language (CQL) query, a Java Persistence Query Language (JPQL) query, a data object-based query language query, a Salesforce Object Query Language (SOQL) query, or any other type of query using a query language supported by the database or a plugin to the database). In some examples, the device 305 may transform the received search query to a database query using the tags and may use the database query to retrieve data records from a database and transmit the retrieved data records as results 390 to the requestor. As one example, the device 305 may generate a database query 380 in a query language as follows:
Search Query: "my won opp last month"→
SELECT Id
FROM Opportunity
WHERE IsWon=true
AND LastModifiedDate>LAST_MONTH
USING SCOPE IS_MINE
LIMIT 50
In another example, for a search query "Company A won opp," the device 305 may generate a database query 380 in a query language as follows:
Search Query: "Company A won opp"→
SELECT Id
FROM Opportunity
WHERE Account.Id='001xx000003GYS3AAO'
AND IsWon=true
LIMIT 50
The device 305 may query a database using the constructed database query 380 and may receive query results (e.g., based on the database processing the database query 380). The device 305 may send the query results (e.g., results 390) to another device (e.g., the user device that sent the search query, another processing device, etc.) or to another component of the device 305 for further processing.

In some examples, the device 305 may determine, at 375, that the search query is not supported as a conceptual query based on an absence of at least one tag of the one or more tags corresponding to a data object stored in a database. In such a case, the device 305 may perform a keyword search 385 using one or more parameters 320 included in the search query. That is, if the device 305 determines at 375 that the search query is not supported as a conceptual query (e.g., the search query does not correspond to an equivalent or similar database query), then the device 305 may fall back to performing a keyword search 385 based on the received search query and may transmit the results 390 of the keyword search 385.

Figure 4:
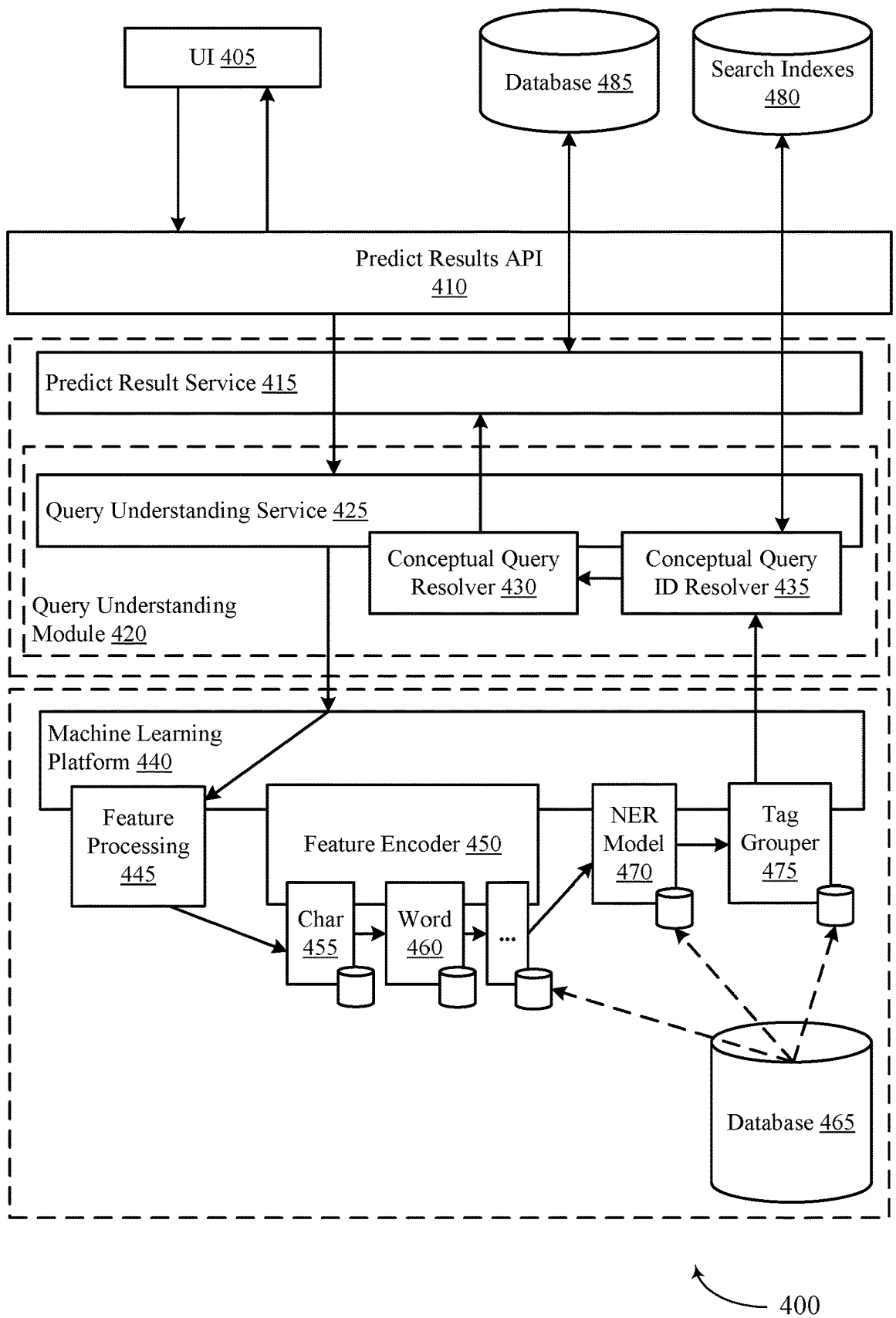
FIG. 4 illustrates an example of an architecture that supports detecting and processing conceptual queries in accordance with aspects of the present disclosure.

FIG. 4 illustrates an example of an architecture 400 that supports detecting and processing conceptual queries in accordance with aspects of the present disclosure. The architecture 400 may be implemented at an application server (not shown) or some other device for hosting an artificial intelligence model, which may be examples of the corresponding devices described with reference to FIGS. 1 through 3. In some cases, some or all of the functionality of the application server may be performed by components of a user device, a database, or some combination thereof as described herein. For example, a user device may support the UI 405, a database may store the search indexes 480 and may be an example of the database 465, the database 485, or both, and an application server may host the predict results API 410, the predict results service 415, the machine learning platform 440, or any combination of these. Alternatively, the components of the architecture 400 may be distributed across a number of devices in different ways. The application server may implement a number of techniques to detect and process conceptual queries using an artificial intelligence model. Alternative examples of the following may be implemented, where some steps are performed in a different order than described or are not performed at all. In some cases, steps may include additional features not mentioned below, or further steps may be added. The architecture 400 may include additional or alternative components to the ones described herein.

A user may utilize a user interface 405 displayed on a user device to transmit a search query. For example, the user may input the search query (e.g., a user query) into the user interface 405 in a similar manner to inputting a String for a keyword search. The search query may include one or more parameters. The user interface 405 may transmit the search query to an application server using an application programming interface (API). For example, the user device may make an API call to a predict results API 410 to transmit the search query to the application server. Although a single search query is illustrated in FIG. 4, it should be understood that multiple users may concurrently transmit requests to run different search queries at the application server. Each search query may be transmitted to the application server using a same or separate predict results API 410 associated with the search queries. As previously discussed, the search query may indicate a context (such as a user identifier, organization name, client domain name, etc.). For example, the user device may identify that a user is logged onto the device using a user identifier, and the user device may include this user identifier with the search query for processing.

Based on the API call to the predict results API 410, the search query may be sent to a query understanding service 425 (e.g., a component of a query understanding module 420). In some examples, the query understanding module 420 may be hosted on an application server. The query understanding service 425 may identify the one or more parameters included in the search query. In one example, the one or more parameters may include one or more portions of the search query. The query understanding service 425 may receive a search query "my accounts," and may determine the one or more parameters as "my," "accounts," or a combination thereof. In some cases, the query understanding service 425 may additionally determine implicit parameters of the query, such as a user, organization, tenant, etc. associated with the search query.

Based on identifying the one or more parameters included in the search query, the query understanding service 425 may forward the one or more parameters to feature processing 445 in a machine learning platform 440 (such as a plugin to TensorFlow™). The feature processing 445 may parse the search query based on the one or more parameters. In some cases, the feature processing 445 may parse the search query to identify one or more words from the search query. Additionally or alternatively, the feature processing 445 may parse the search query to identify one or more characters from the search query. Referring to the example search query "my accounts," the feature processing 445 may parse the search query to identify the words "my," and "accounts." Additionally or alternatively, the feature processing 445 may parse the search query to identify the characters "m," "y," "a," "c," "c," "o," "u," "n," "t," and "s."

The feature encoder 450 may then encode the features (such as words and/or characters) from the search query to determine numerical values associated with the features of the search query. In one example, the feature encoder 450 may determine one or more numerical values associated with the one or more words and may determine one or more numerical values associated with the one or more characters. In some cases, the feature encoder 450 may generate (or determine) one or more arrays based on parsing the search query into words and/or characters. The feature encoder 450 may generate a character array 455 (e.g., based on a character array generator), a word array 460 (e.g., based on a word array generator), or both. For example, the character array generator may generate an input array (e.g., a character array 455) including the one or more numerical values associated with the one or more characters. For instance, the character array generator may generate an input array as chars query=[48, 2, 24, 4, 78, 41, 48, 11, 12, 4, 0, . . . , 0] for the example search query "my accounts." In some cases, the word array generator may generate an input array (e.g., a word array 460) including the one or more numerical values associated with the one or more words. For instance, the word array generator may generate an input array as words query=[3, 45, 0, 0, . . . , 0] for the example search query "my accounts." In some examples, the feature encoder 450 (such as the character array generator and the word array generator) may generate the input arrays using numerical values received from database 465. In other examples, the feature encoder 450 may implement encoding processes based on an encoding repository (repo) at the database 465. The encoding repo may store one or more software packages supporting input array generation. In some cases, the feature encoder 450 may encode additional or alternative input arrays based on the search query.

The feature encoder 450 may input an input array (such as the array including the numerical values associated with the one or more words, the array including numerical values associated with the one or more characters, or both) into a neural network. For example, the feature encoder 450 may input the input array to a Named Entity Recognition model 470. The neural network (e.g., an underlying trained model, parameters or weights for the model, tagging rules, etc.) may be supported by (e.g., stored at) a database, such as database 465. The Named Entity Recognition model 470 may provide an output (e.g., an output array) in response to receiving the input array. In some cases, the Named Entity Recognition model 470 may determine one or more tags based on the output. The Named Entity Recognition model 470 may determine either no tags or one or more tags associated with each parameter included in the search query. In some examples, the one or more tags may include different entities, scopes, Boolean fields, picklist values, or any combination of these or other tags relevant to constructing database queries. The Named Entity Recognition model 470 may tag the search query using the one or more tags associated with the one or more parameters. In some cases, the Named Entity Recognition model 470 may output a probability value associated with each tag (e.g., a probability that the tag applies to the search query, a specific word in the search query, a set of words in the search query, etc.). The Named Entity Recognition model 470 may tag a search query based on the probability values (e.g., using a most probable tag of the set of tags, using any tag with a probability value greater than some probability threshold, etc.).

As one example, where the Named Entity Recognition model 470 is an engine supporting data creation with an IOB format, the Named Entity Recognition model 470 may output the probabilities for the search query "my accounts" as: my=[B-UDD_MINE(0.95), O(0.04), . . . ] and accounts= [B-UDD_ACC(0.90)], I-UDD_ACC(0.05), . . . ]. Here, B-UDD_MINE refers to the beginning of an identified token from a universal data dictionary (UDD) (e.g., the "mine" token, which may be an UDD-specific concept). The UDD may apply to the database from which the user requests data using the search query. 0 refers to a word not understood by the system (e.g., which may be read as "other" for the purpose of generating a database query). Similarly, B-UDD_ACC may refer to the beginning of an identified "account" token specific to the UDD and I-UDD_ACC may refer to a continuation of an identified "account" token specific to the UDD. Based on this output, the Named Entity Recognition model 470 may tag the parameter "my" with a tag of UDD_MINE based on the probability value of 0.95. In some cases, the machine learning platform 440 may analyze the search query based on each possible tag or a subset of possible tags (e.g., where "my" may be tagged with UDD_MINE and/or 0 for further processing). The Named Entity Recognition model 470 may further tag the parameter "accounts" with a tag UDD_ACC based on the probability value of 0.90. In some cases, the Named Entity Recognition model 470 may determine tags based on other tags. For example, as "my" is not tagged as the beginning of an account token, "account" may not be tagged with I-UDD_ACC, as the model may require an "inside" tag to follow a corresponding "beginning" tag (or a chain of "inside" tags following a "beginning" tag). In cases using "inside" tags, the tag grouper 475 may associate multiple parameters with a same tag. For example, for a search query "my won opp last month" and based on probabilities output by the neural network, tagging rules, or both, the tag grouper 475 may determine that "last" corresponds to a tag B-DATE_PERIOD and "month" corresponds to a tag I-DATE_PERIOD. As such, the tag grouper 475 may group "last" and "month" together and tag the set of words with DATE_PERIOD, such that the search query indicates a data period of "last month" for a conceptual query. In some examples, the tag grouper 475 may not perform any groupings.

The machine learning platform 440 may send the resulting search query with the determined tags to a conceptual query ID resolver 435 (e.g., at the query understanding service 425 of a query understanding module 420). The conceptual query ID resolver 435 may determine if there is an entity tagged in the search query that corresponds to an ID in a database. For example, the conceptual query ID resolver 435 may determine whether at least one parameter included in the search query corresponds to at least one of a name of a person, a name of an organization, or a combination thereof. In some examples, the conceptual query ID resolver 435 may resolve the at least one parameter to an identifier (e.g., a unique identifier) associated with at least one of the person, the organization, or a combination thereof. For example, the conceptual query ID resolver 435 may determine a value in a database associated with the name of the person or the name of the organization included in the search query. The conceptual query ID resolver 435 may resolve the name of the person or organization tagged to a single ID (e.g., by searching for an index 480 in a database).

The conceptual query ID resolver 435 may forward the search query (e.g., with tags and resolved IDs) to conceptual query resolver 430. The conceptual query resolver 430 may determine that the search query is supported as a conceptual query based on a tag of the one or more tags corresponding to a data object stored in database 465 (e.g., for the search query "my accounts," the parameter "accounts" may be tagged as an account data object). If the conceptual query resolver 430 determines that conceptual query is supported, the conceptual query resolver 430 may generate a database query in a query language based on the search query. For example, the conceptual query resolver 430 may determine metadata based on the one or more tags associated with the one or more parameters (e.g., the scope "mine" and the data object "account") and may pass this metadata to a predict result service 415 (e.g., wrapped in a conceptual query object). The predict result service 415 may then generate a database query (e.g., "Select ID from ACCOUNTS using SCOPE MINE") in a supported query language using the generated metadata. In some cases, the predict result service 415 may additionally or alternatively generate a feedback message based on the results of the conceptual query resolver 430. The predict result service 415 may retrieve, from the database 485, a set of results for the search query using the database query in the query language. For example, the predict result service 415 may execute the database query "Select ID from ACCOUNTS using SCOPE MINE" at the database 485 and may receive a set of IDs for accounts owned by the user who input the search query in response. The predict result service 415 may transmit the set of results (e.g., via the predict results API 410) for display in the user interface 405.

The database 485, the database 465, and the search indexes 480 may correspond to a same database or database system or different databases or database systems. In some cases, the conceptual query resolver 430, predict result service 415, or both may determine a database language for database query construction based on the database 485. For example, the database query may be constructed for a conceptual query using a database language supported by the database 485. In other cases, the database query language may be configured for the predict result service 415 independent of the database 485. Additionally or alternatively, the machine learning platform 440 may determine tags based on the database 485. For example, the tags may be determined based on fetching data object types, data field types, or a combination thereof from the database 485. This may allow the query understanding service 425 to determine whether the tags support a conceptual query, as the tags may indicate if the search query refers to a specific data object type or data field stored in the database 485. In some cases, the tags may be determined based on a pre-defined list of tags for the neural network.

Figure 5:
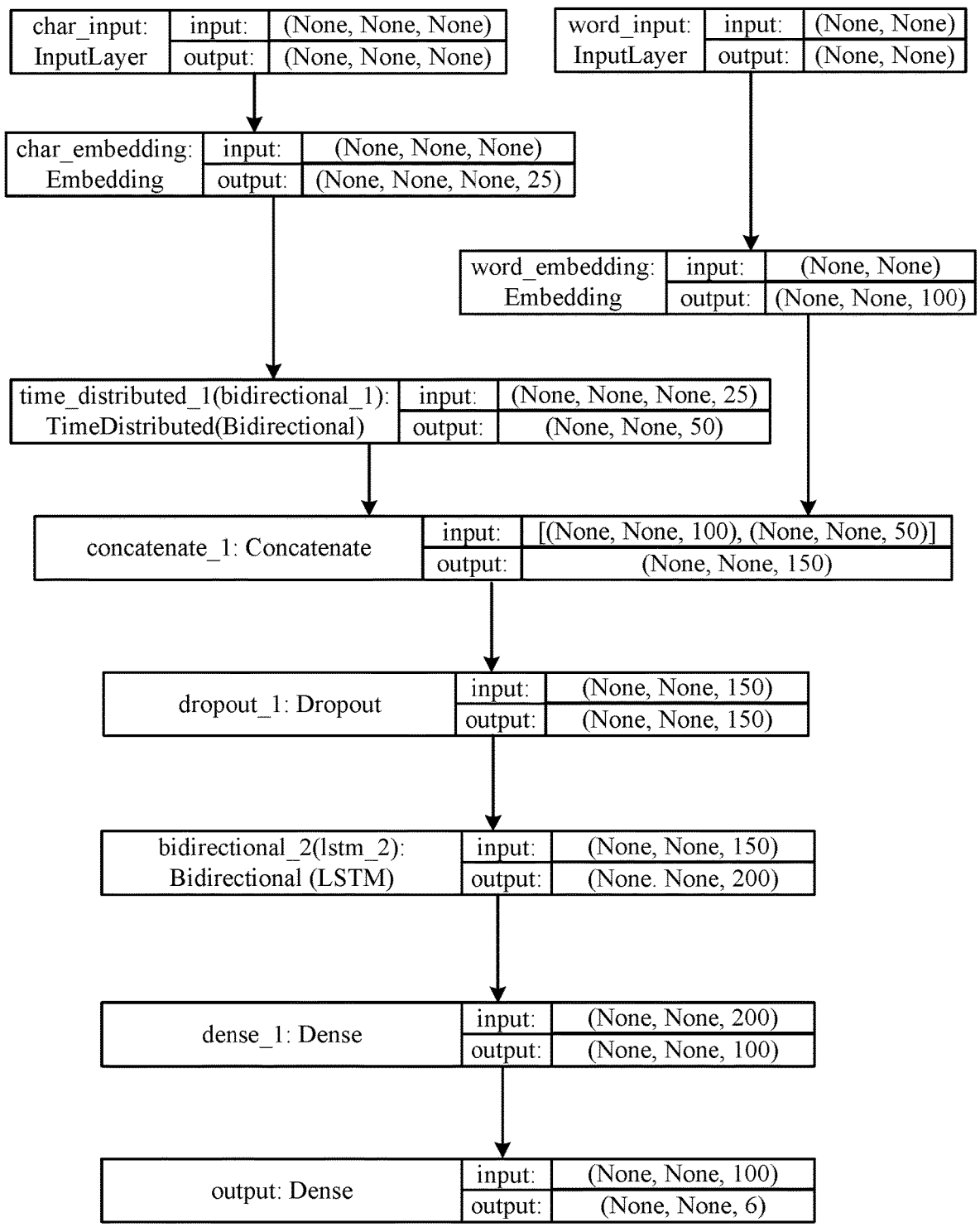
FIG. 5 illustrates an example of an artificial intelligence model that supports detecting and processing conceptual queries in accordance with aspects of the present disclosure.

FIG. 5 illustrates an example of an artificial intelligence model 500 that supports detecting and processing conceptual queries in accordance with aspects of the present disclosure. The artificial intelligence model 500 may be hosted (i.e., stored and run) at an application server (not shown) or some other device for hosting an artificial intelligence model, which may be examples of the corresponding devices described with reference to FIGS. 1 through 4. In some cases, some or all of the functionality of the artificial intelligence model 500 may be performed by components of a user device and/or a database. The artificial intelligence model 500 may act as a search assistant and may implement a number of techniques to detect and process conceptual queries. As described herein, the artificial intelligence model 500 may receive a search query (or multiple portions of the search query). The search query may include one or more parameters. In some examples, the artificial intelligence model 500 may identify one or more words from the search query based on the one or more parameters. Additionally or alternatively, the artificial intelligence model 500 may identify one or more characters from the search query based on the one or more parameters. It is to be understood that the artificial intelligence model 500 described herein is one specific example of an artificial intelligence model 500 for tagging a search query, and other artificial intelligence models may be implemented within the scope of the claims. The artificial intelligence model 500 may be an example of a recurrent neural network (RNN), a long short-term memory (LSTM) neural network, or any other type of neural network.

As illustrated in FIG. 5, the artificial intelligence model 500 may receive an input array including the one or more characters as a first input (i.e., char_input) and an input array including the one or more words as a second input (i.e., word_input). These input arrays may be input into the input layer of the artificial intelligence model 500. In some cases, a system may implement different artificial intelligence models 500 for different types of input arrays (e.g., char_input versus word_input), for different databases or database types, for different tenants in a multi-tenant database system, for different users, for different user or organization access levels, or for some combination of these.

The artificial intelligence model 500 may perform embedding on the input arrays to convert the input arrays into vector representations. In this way, the input arrays may be mapped into a vector space based on the neural network embedding. For example, a first embedding for the input array including the one or more characters (i.e., char_embedding) may be mapped to an n-dimensional vector (e.g., a vector of 25 dimensions) and a second embedding for the input array including the one or more words (i.e., word_embedding) may be mapped to an m-dimensional vector (e.g., a vector of 100 dimensions). In some cases, the artificial intelligence model 500 may modify the char_embedding vector using a time distributed, bidirectional process to obtain a time distributed bidirectional vector. The artificial intelligence model 500 may concatenate the time distributed bidirectional vector with the word_embedding vector to obtain a concatenated output. In some cases, as illustrated in FIG. 5, the artificial intelligence model 500 may perform a dropout procedure on the concatenated output to obtain a dropout output. The artificial intelligence model 500 may perform another bidirectional process on the dropout output (e.g., in an LSTM neural network) to determine a bidirectional output. The output from the bidirectional LSTM process may be input to a dense layer of the neural network, and the output from the dense layer may be sent to an output layer. The artificial intelligence model 500 may determine the output of the neural network based on the output array in the output layer and may determine one or more tags associated with the input search query based on the output array from the output layer.

In some cases, the system may train a neural network (e.g., the artificial intelligence model 500) to handle tagging search queries. The neural network may be trained offline or online. In some cases, an online neural network may be updated (e.g., either online or offline) to add new features, improve performance, etc. In some case, online training may support user-specific or tenant-specific models for tagging search queries.

Neural network training may involve receiving pre-tagged search queries (e.g., training data) from a user, where the neural network may learn how the queries are tagged based on the user assigned tags. The neural network may update weights of inputs to a node, node functions, the nodes in a layer, the layers in the network, or some combination of these based on the training data. Additionally or alternatively, the neural network may determine tags for search queries and may receive feedback on those tags from a user. Based on the feedback, the neural network may update weights or nodes of the network for improved tagging accuracy. In some cases, the system may mine information from the Internet (e.g., user information, organization information, location information, etc.) for improved tagging. The system may additionally improve word-based encoding, character-based encoding, or both using the above techniques or similar techniques. These encoding processes may result in each word and/or character in a search query mapping to an integer value.

In some cases, based on the neural network training, the neural network may handle different knowledge domains for different users and different customized CRM systems. For example, if a user introduces new data objects or data fields into a CRM system, the neural network may identify these new data objects or data fields and may learn how to identify and tag characters, words, and/or phrases in a search query intended to reference these new data objects or data fields. Additionally, the neural network training may support tenant security in a multi-tenant database system by learning using non-tenant specific search queries or by anonymizing tenant-specific training data. In some cases, tenant-specific neural networks may be trained to enforce the security of tenant-specific training data.

Figure 6:
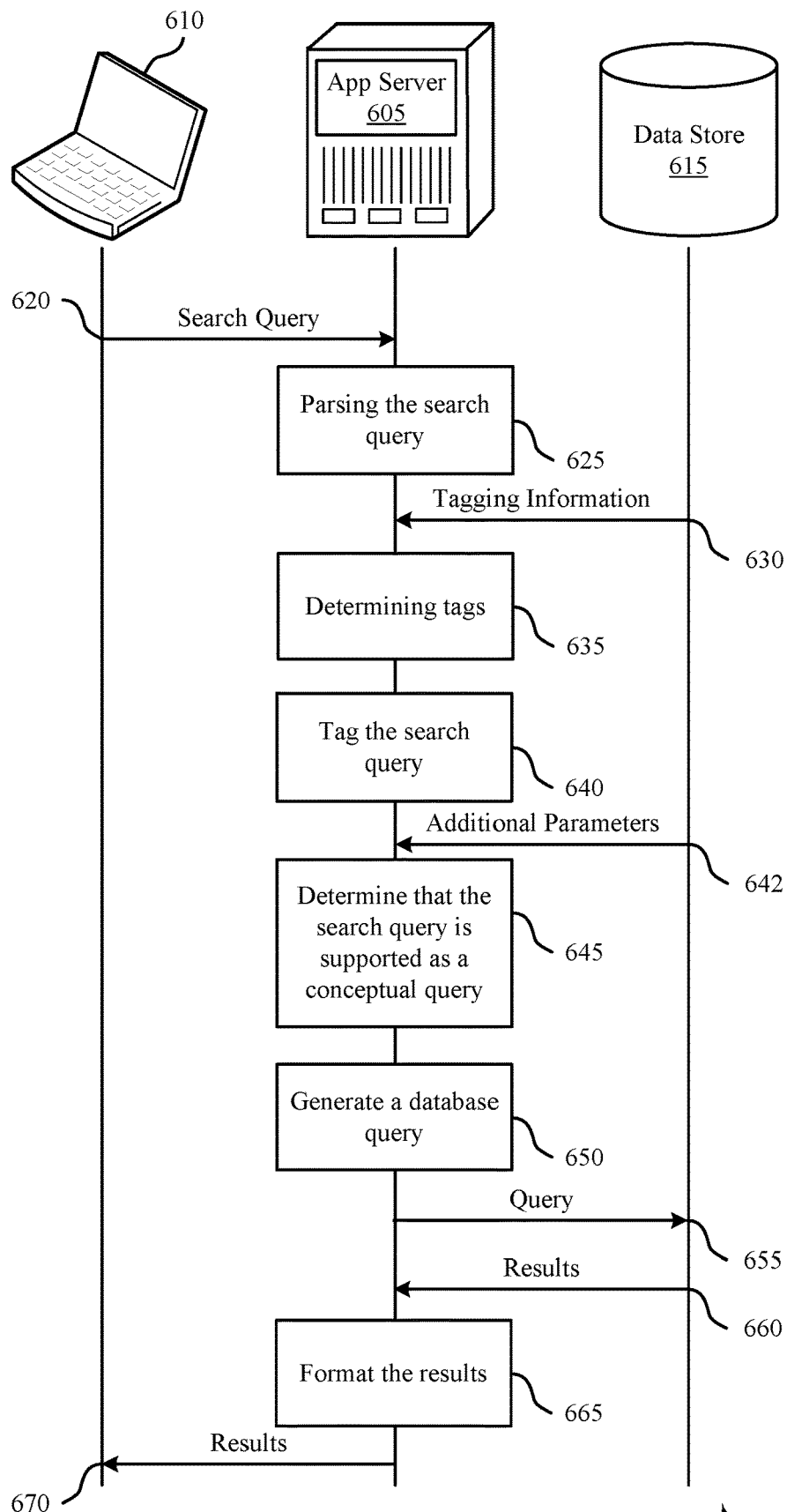
FIG. 6 illustrates an example of a process flow that supports detecting and processing conceptual queries in accordance with aspects of the present disclosure.

FIG. 6 illustrates an example of a process flow 600 that supports detecting and processing conceptual queries in accordance with aspects of the present disclosure. The process flow 600 may involve an application server 605 or some other device for hosting an artificial intelligence model, a user device 610, and a data store 615, which may be examples of the corresponding devices described with reference to FIGS. 1 through 5. In some cases, some or all of the functionality of the application server 605 may be performed by components of the user device 610 or the data store 615. The application server 605 may implement a number of techniques to detect and process conceptual queries using artificial intelligence models. Alternative examples of the following may be implemented, where some steps are performed in a different order than described or are not performed at all. In some cases, steps may include additional features not mentioned below, or further steps may be added.

At 620, a user may utilize the user device 610 to input a search query including one or more parameters (e.g., via a search field in a user interface). The user device 610 may send the search query to the application server 605 (e.g., via an API) for processing. In some cases, multiple users may simultaneously or concurrently input requests to run different search queries. Each search query may be processed using an artificial intelligence model. In some cases, multiple search queries may be processed using the same artificial intelligence model. According to one or more aspects, the search query may indicate a context (such as a user ID, organization name, client domain name, etc.). The application server 605 may identify the context associated with the request. Additionally, the application server 605 may identify the one or more parameters included in the search query.

The application server 605 may parse the search query based on the one or more parameters at 625. In some examples, the application server 605 may parse the search query to identify one or more words from the search query. In some examples, the application server 605 may parse the search query to identify one or more characters from the search query. The application server 605 may then encode the features (such as words and characters) from the search query to determine numerical values associated with the features of the search query. In one example, the application server 605 may determine one or more numerical values associated with the one or more words and may determine one or more numerical values associated with the one or more characters.

The application server 605 may generate (or determine) an input array based on parsing the search query. For example, the application server 605 may generate an input array including the one or more numerical values associated with the one or more words. Additionally or alternatively, the application server 605 may generate an input array including the one or more numerical values associated with the one or more characters. In some cases, prior to generating the input array, the application server 605 may receive information related to determining the numerical values from the data store 615 at 630. In one example, the application server 605 may input the input array (such as the array including the numerical values associated with the one or more words or the array including numerical values associated with the one or more characters) to a neural network. In response to inputting the input array, the application server 605 may obtain an output of the neural network. In some cases, the neural network may be received or updated based on information received from the data store 615 at 630.

At 635, the application server 605 may determine one or more tags based on the output of the neural network. In some examples, the application server 605 may determine one or more tags associated with each parameter included in the search query. In one example, the application server 605 may determine that a first tag and a second tag are associated with a parameter included in the search query. In such cases, the application server 605 may combine the first tag and the second tag associated with the parameter. In a second example, the application server 605 may determine that a first parameter and a second parameter are associated with a same tag. In such cases, the application server 605 may combine the first and second parameters (e.g., multiple words in the search query) and may tag the combined parameters with the shared tag.

At 640, the application server 605 may tag the search query using one or more tags associated with the one or more parameters. In some examples, the application server 605 may utilize the one or more tags determined based on a neural network at 635. In some examples, the application server 605 may identify a set of data object types stored in the data store 615 based on a configured list of data object types supported by the data store 615. In some examples, the application server 605 may receive the configured list of data object types from the data store 615 (not shown) or from a user (not shown). The application server 605 may determine that a tag of the one or more tags corresponds to a data object (e.g., a data object type, a data field, etc.) stored in the data store 615 (e.g., based on identifying the set of supported data object types).

At 642, the application server 605 may receive additional parameters related to the search query from the data store 615 or a search server. In some cases, the application server 605 may determine one or more identifiers associated with the one or more tags based on the additional parameters. For example, upon determining that a tag corresponds to a user, the application server 605 may use the additional parameters to resolve the name of the user to an identifier (such as a value in the data store 615). That is, the application server 605 may determine a value in the data store 615 associated with a name of a person or a name of an organization identified from the search query. The application server 605 may resolve the name of the person or organization tagged to a single identifier (e.g., by using the additional parameters). In some cases, the application server 605 may identify one or more relevant records (such as records stored in the data store 615) associated with the person and/or the organization using the additional parameters. Additionally or alternatively, the application server 605 may identify potential picklist values associated with the one or more tags (determined at 640) based on the additional parameters.

At 645, the application server 605 may determine that the search query is supported as a conceptual query based on the tag (determined at 640) of the one or more tags corresponding to a data object stored in the data store 615. In some cases, the application server 605 may determine that the search query is supported as a conceptual query based on the additional parameters received at 642.

At 650, the application server 605 may generate a database query in a query language based on the search query. In one example, the application server 605 may generate the database query based on the one or more tags and based on determining that the search query is supported as the conceptual query. For example, the application server 605 may generate a database query in a standardized query language (e.g., a language supported by the data store 615).

At 655, the application server 605 may query the data store 615 using the generated database query and may receive one or more results to the query at 660. That is, the application server 605 may retrieve, from the data store 615, a set of results for the search query based on executing the database query in the query language. At 665, the application server 605 may format the received set of results for the search query for display in a user interface of the user device. At 670, the application server 605 may transmit the set of results to the user device 610.

Figure 7:
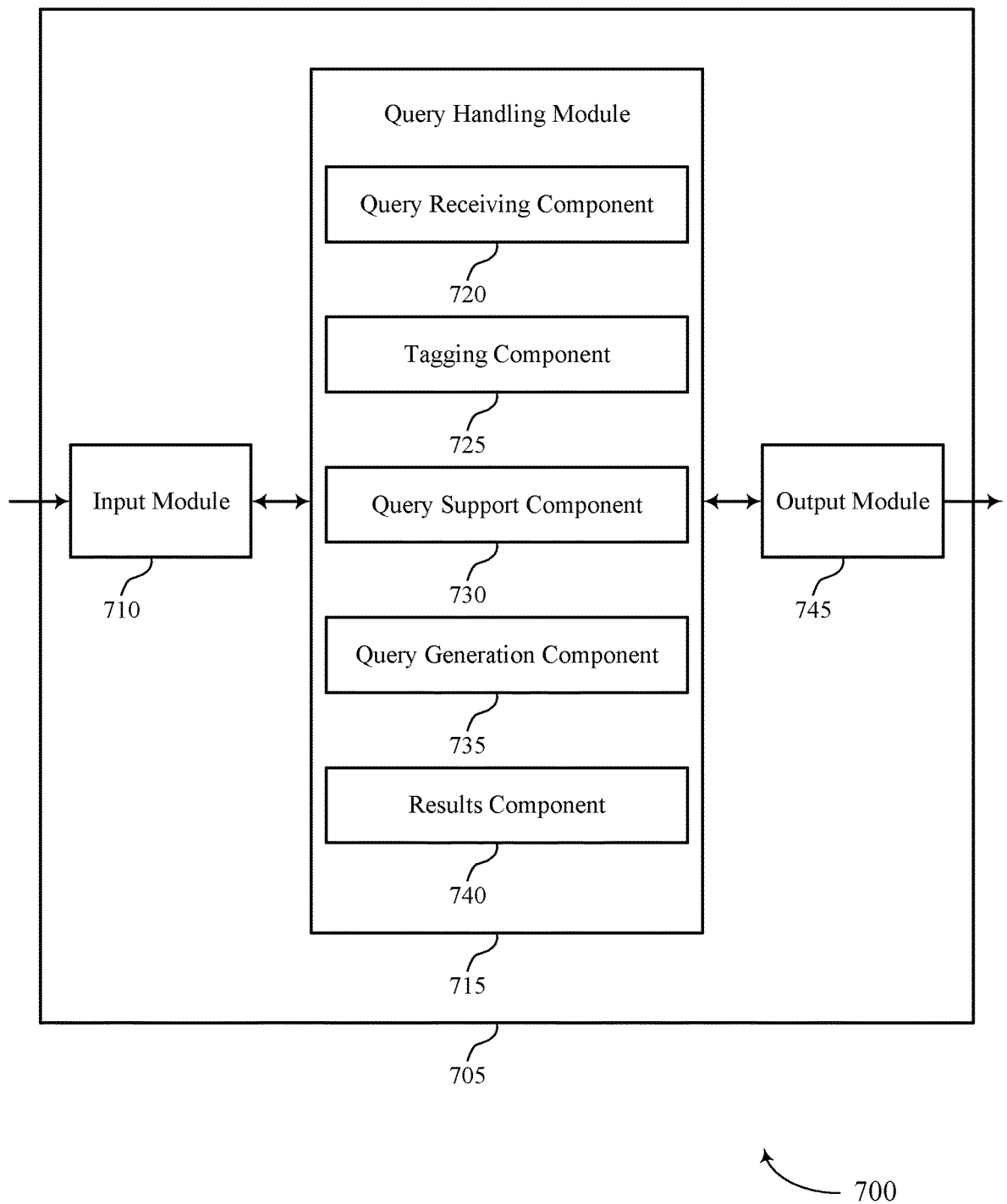
FIG. 7 shows a block diagram of an apparatus that supports detecting and processing conceptual queries in accordance with aspects of the present disclosure.

FIG. 7 shows a block diagram 700 of an apparatus 705 that supports detecting and processing conceptual queries in accordance with aspects of the present disclosure. The apparatus 705 may include an input module 710, a query handling module 715, and an output module 745. The apparatus 705 may also include a processor. Each of these components may be in communication with one another (e.g., via one or more buses). In some cases, the apparatus 705 may be an example of a user terminal, a database server, an application server, or a system containing multiple computing devices.

The input module 710 may manage input signals for the apparatus 705. For example, the input module 710 may identify input signals based on an interaction with a modem, a keyboard, a mouse, a touchscreen, or a similar device. These input signals may be associated with user input or processing at other components or devices. In some cases, the input module 710 may utilize an operating system such as iOS®, ANDROID®, MS-DOS®, MS-WINDOWS®, OS/2®, UNIX®, LINUX®, or another known operating system to handle input signals. The input module 710 may send aspects of these input signals to other components of the apparatus 705 for processing. For example, the input module 710 may transmit input signals to the query handling module 715 to support detecting and processing conceptual queries. In some cases, the input module 710 may be a component of an input/output (I/O) controller 915 as described with reference to FIG. 9.

The query handling module 715 may include a query receiving component 720, a tagging component 725, a query support component 730, a query generation component 735, and a results component 740. The query handling module 715 may be an example of aspects of the query handling module 805 or 910 described with reference to FIGS. 8 and 9.

The query handling module 715 and/or at least some of its various sub-components may be implemented in hardware, software executed by a processor, firmware, or any combination thereof. If implemented in software executed by a processor, the functions of the query handling module 715 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The query handling module 715 and/or at least some of its various sub-components may be physically located at various positions, including being distributed such that portions of functions are implemented at different physical locations by one or more physical devices. In some examples, the query handling module 715 and/or at least some of its various sub-components may be a separate and distinct component in accordance with various aspects of the present disclosure. In other examples, the query handling module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The query receiving component 720 may receive (e.g., at a server, which may include the apparatus 705), from a user device, a search query including one or more parameters. The tagging component 725 may tag the search query using one or more tags associated with the one or more parameters, where the one or more tags are determined based on a neural network. The query support component 730 may determine that the search query is supported as a conceptual query based on a tag of the one or more tags corresponding to a data object stored in a database. The query generation component 735 may generate a database query in a query language based on the search query, where the generating is based on the one or more tags and determining that the search query is supported as the conceptual query. The results component 740 may retrieve, from the database, a set of results for the search query using the database query in the query language and may transmit, to the user device, the set of results for the search query.

The output module 745 may manage output signals for the apparatus 705. For example, the output module 745 may receive signals from other components of the apparatus 705, such as the query handling module 715, and may transmit these signals to other components or devices. In some specific examples, the output module 745 may transmit output signals for display in a user interface, for storage in a database or data store, for further processing at a server or server cluster, or for any other processes at any number of devices or systems. In some cases, the output module 745 may be a component of an I/O controller 915 as described with reference to FIG. 9.

Figure 8:
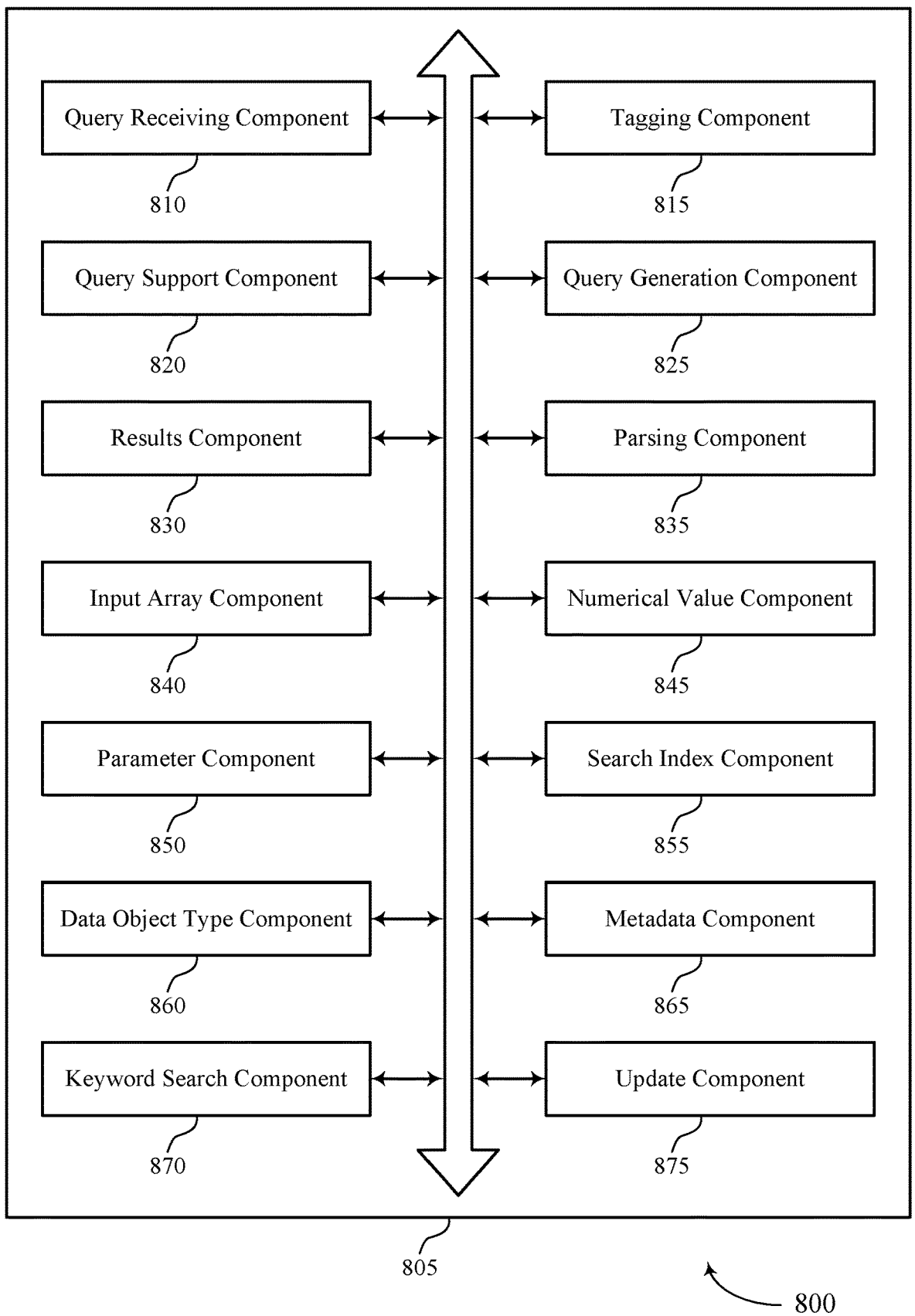
FIG. 8 shows a block diagram of a query handling module that supports detecting and processing conceptual queries in accordance with aspects of the present disclosure.

FIG. 8 shows a block diagram 800 of a query handling module 805 that supports detecting and processing conceptual queries in accordance with aspects of the present disclosure. The query handling module 805 may be an example of aspects of a query handling module 715 or a query handling module 910 described herein. The query handling module 805 may include a query receiving component 810, a tagging component 815, a query support component 820, a query generation component 825, a results component 830, a parsing component 835, an input array component 840, a numerical value component 845, a parameter component 850, a search index component 855, a data object type component 860, a metadata component 865, a keyword search component 870, and an update component 875. Each of these modules may communicate, directly or indirectly, with one another (e.g., via one or more buses). In some cases, the query handling module 805 may support query handling at a server (e.g., an application server, a database server, a server cluster, a virtual machine, a container, or any other device or system supporting query handling).

The query receiving component 810 may receive, from a user device, a search query including one or more parameters. The tagging component 815 may tag the search query using one or more tags associated with the one or more parameters, where the one or more tags are determined based on a neural network. In some cases, the neural network includes or is an example of a Named Entity Recognition system. The query support component 820 may determine that the search query is supported as a conceptual query based on a tag of the one or more tags corresponding to a data object stored in a database. The query generation component 825 may generate a database query in a query language based on the search query, where the generating is based on the one or more tags and determining that the search query is supported as the conceptual query. The results component 830 may retrieve, from the database, a set of results for the search query using the database query in the query language. In some examples, the results component 830 may transmit, to the user device, the set of results for the search query.

The parsing component 835 may parse the search query based on the one or more parameters. The input array component 840 may determine an input array based on parsing the search query. In some examples, the input array component 840 may input the input array into the neural network. In some examples, the input array component 840 may obtain an output of the neural network based on inputting the input array. In some examples, the tagging component 815 may determine the one or more tags based on the output of the neural network, where tagging the search query using the one or more tags is based on determining the one or more tags.

In some examples, the parsing component 835 may parse the search query to identify one or more words. The numerical value component 845 may determine one or more numerical values associated with the one or more words, where the input array includes the one or more numerical values. In some examples, the parsing component 835 may parse the search query to identify one or more characters. In some examples, the numerical value component 845 may determine one or more numerical values associated with the one or more characters, where the input array includes the one or more numerical values.

In some examples, the tagging component 815 may determine that a first tag and a second tag are associated with a parameter included in the search query. In some examples, the tagging component 815 may combine the first tag and the second tag associated with the parameter, where tagging the search query is based on combining the first tag and the second tag.

The parameter component 850 may determine that at least one parameter from the one or more parameters includes at least one of a name of a person, a name of an organization, or a combination thereof. In some examples, the parameter component 850 may resolve the at least one parameter to a unique identifier associated with at least one of the person, the organization, or a combination thereof.

The search index component 855 may query a search index database based on the at least one parameter. In some examples, the search index component 855 may receive, from the search index database, the unique identifier based on the querying. The data object type component 860 may identify a set of data object types stored in the database based on a configured list of data object types supported by the database. In some examples, the data object type component 860 may determine the tag of the one or more tags corresponding to the data object stored in the database based on identifying the set of data object types.

In some examples, the data object type component 860 may retrieve, from the database, information indicating the set of data object types supported by the database. In some examples, the data object type component 860 may configure the configured list of data object types based on the retrieved information indicating the set of data object types supported by the database.

The metadata component 865 may determine metadata based on the one or more tags associated with the one or more parameters. In some examples, the query generation component 825 may generate at least one of the database query in the query language, the set of results for the search query, or a combination thereof based on the metadata.

In some examples, the query receiving component 810 may receive, from the user device, a second search query including one or more additional parameters. In some examples, the tagging component 815 may tag the second search query using one or more additional tags associated with the one or more additional parameters, where the one or more additional tags are determined based on the neural network. In some examples, the query support component 820 may determine that the second search query is not supported as a second conceptual query based on the one or more additional tags. The keyword search component 870 may perform a keyword search using the one or more additional parameters included in the second search query based on the second search query not supporting the second conceptual query. In some examples, the results component 830 may retrieve a second set of results for the second search query based on the keyword search. In some examples, the results component 830 may transmit, to the user device, the second set of results for the second search query.

The update component 875 may update the neural network based on identifying one or more pre-tagged queries, receiving an update to the database, or both, where the one or more tags are determined based on updating the neural network. In some examples, the tagging component 815 may tag the search query using the one or more tags according to an IOB format.

In some examples, the query generation component 825 may identify at least one of an entity, a scope, a time period, a field value, or a combination thereof based on the one or more tags, where generating the database query in the query language is based on the identifying. In some examples, the results component 830 may format the set of results for the search query for display in a user interface of the user device.

Figure 9:
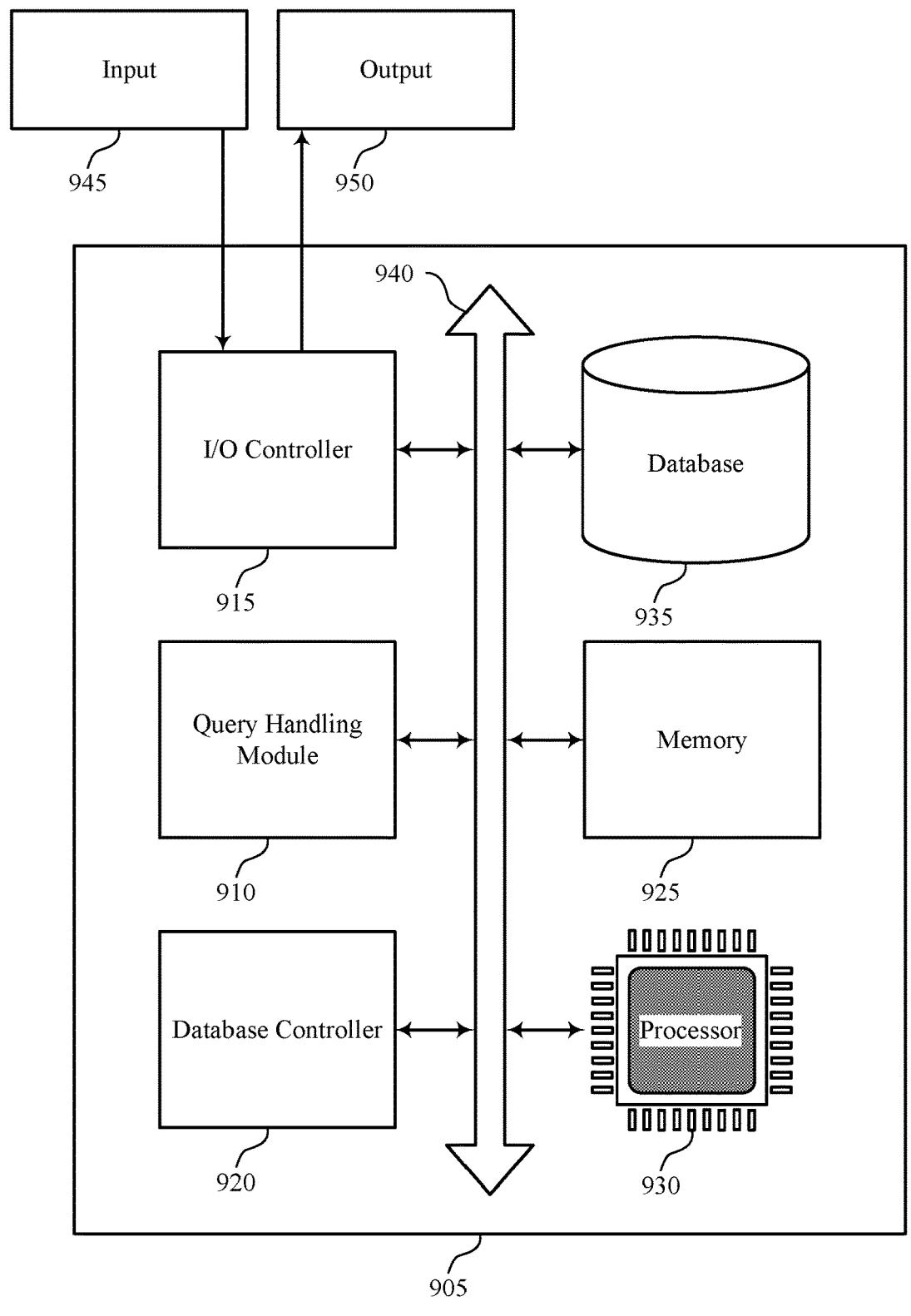
FIG. 9 shows a diagram of a system including a device that supports detecting and processing conceptual queries in accordance with aspects of the present disclosure.

FIG. 9 shows a diagram of a system 900 including a device 905 that supports detecting and processing conceptual queries in accordance with aspects of the present disclosure. The device 905 may be an example of or include the components of an application server or an apparatus 705 as described herein. The device 905 may include components for bi-directional data communications including components for transmitting and receiving communications, including a query handling module 910, an I/O controller 915, a database controller 920, memory 925, a processor 930, and a database 935. These components may be in electronic communication via one or more buses (e.g., bus 940).

The query handling module 910 may be an example of a query handling module 715 or 805 as described herein. For example, the query handling module 910 may perform any of the methods or processes described above with reference to FIGS. 7 and 8. In some cases, the query handling module 910 may be implemented in hardware, software executed by a processor, firmware, or any combination thereof.

The I/O controller 915 may manage input signals 945 and output signals 950 for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The database controller 920 may manage data storage and processing in a database 935. In some cases, a user may interact with the database controller 920. In other cases, the database controller 920 may operate automatically without user interaction. The database 935 may be an example of a single database, a distributed database, multiple distributed databases, a data store, a data lake, or an emergency backup database.

Memory 925 may include random-access memory (RAM) and read-only memory (ROM). The memory 925 may store computer-readable, computer-executable software including instructions that, when executed, cause the processor to perform various functions described herein. In some cases, the memory 925 may contain, among other things, a basic I/O system (BIOS) which may control basic hardware or software operation such as the interaction with peripheral components or devices.

The processor 930 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 930 may be configured to operate a memory array using a memory controller. In other cases, a memory controller may be integrated into the processor 930. The processor 930 may be configured to execute computer-readable instructions stored in a memory 925 to perform various functions (e.g., functions or tasks supporting detecting and processing conceptual queries).

Figure 10:
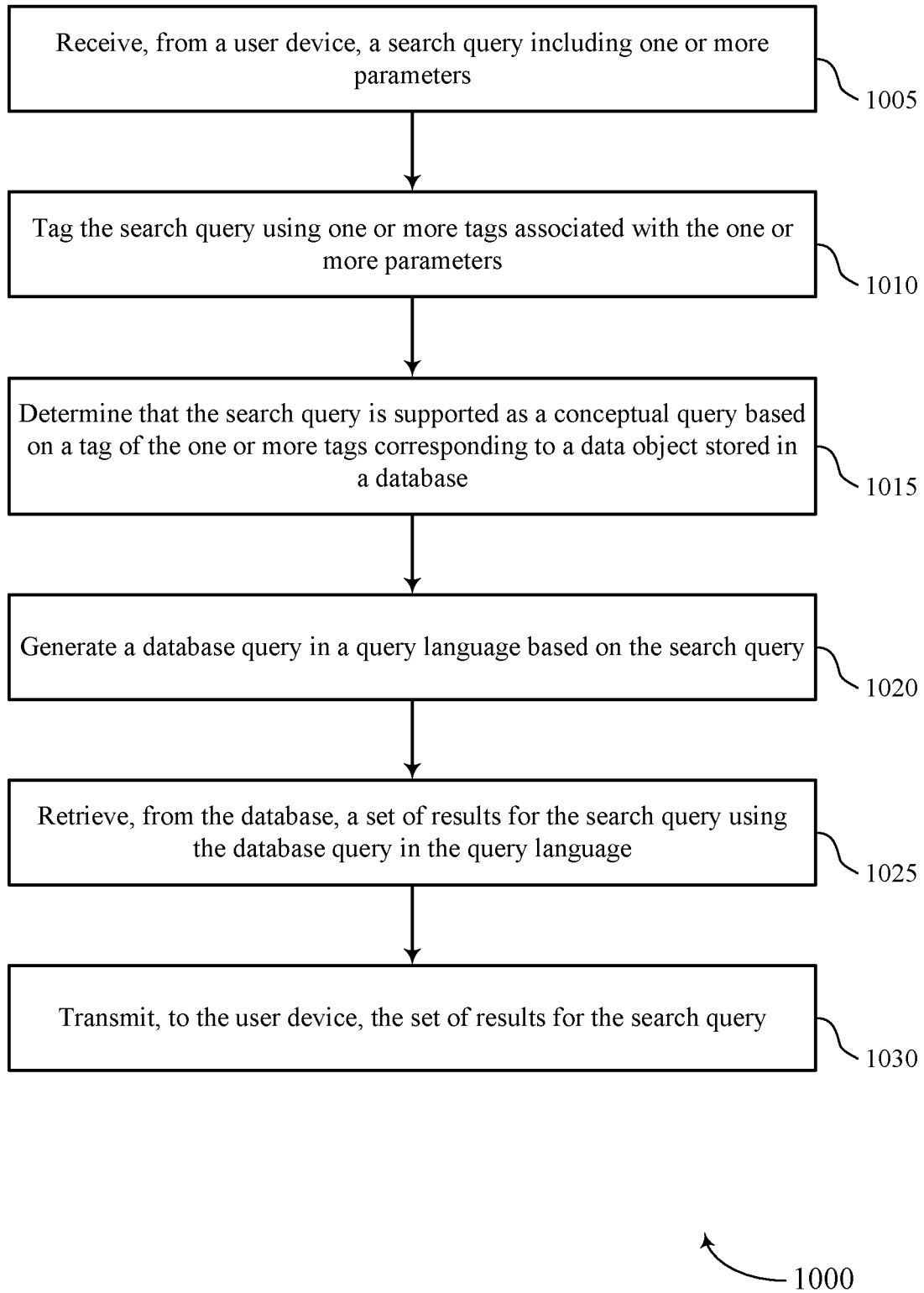
FIGS. 10 through 12 show flowcharts illustrating methods that support detecting and processing conceptual queries in accordance with aspects of the present disclosure.

FIG. 10 shows a flowchart illustrating a method 1000 that supports detecting and processing conceptual queries in accordance with aspects of the present disclosure. The operations of method 1000 may be implemented by an application server or its components as described herein. For example, the operations of method 1000 may be performed by a query handling module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1005, the application server may receive, from a user device, a search query including one or more parameters. The operations of 1005 may be performed according to the methods described herein. In some examples, aspects of the operations of 1005 may be performed by a query receiving component as described with reference to FIGS. 7 through 9.

At 1010, the application server may tag the search query using one or more tags associated with the one or more parameters. In some cases, the one or more tags are determined based on a neural network. The operations of 1010 may be performed according to the methods described herein. In some examples, aspects of the operations of 1010 may be performed by a tagging component as described with reference to FIGS. 7 through 9.

At 1015, the application server may determine that the search query is supported as a conceptual query based on a tag of the one or more tags corresponding to a data object stored in a database. The operations of 1015 may be performed according to the methods described herein. In some examples, aspects of the operations of 1015 may be performed by a query support component as described with reference to FIGS. 7 through 9.

At 1020, the application server may generate a database query in a query language based on the search query. In some cases, the generating is based on the one or more tags and determining that the search query is supported as the conceptual query. The operations of 1020 may be performed according to the methods described herein. In some examples, aspects of the operations of 1020 may be performed by a query generation component as described with reference to FIGS. 7 through 9.

At 1025, the application server may retrieve, from the database, a set of results for the search query using the database query in the query language. The operations of 1025 may be performed according to the methods described herein. In some examples, aspects of the operations of 1025 may be performed by a results component as described with reference to FIGS. 7 through 9.

At 1030, the application server may transmit, to the user device, the set of results for the search query. The operations of 1030 may be performed according to the methods described herein. In some examples, aspects of the operations of 1030 may be performed by a results component as described with reference to FIGS. 7 through 9.

Figure 11:
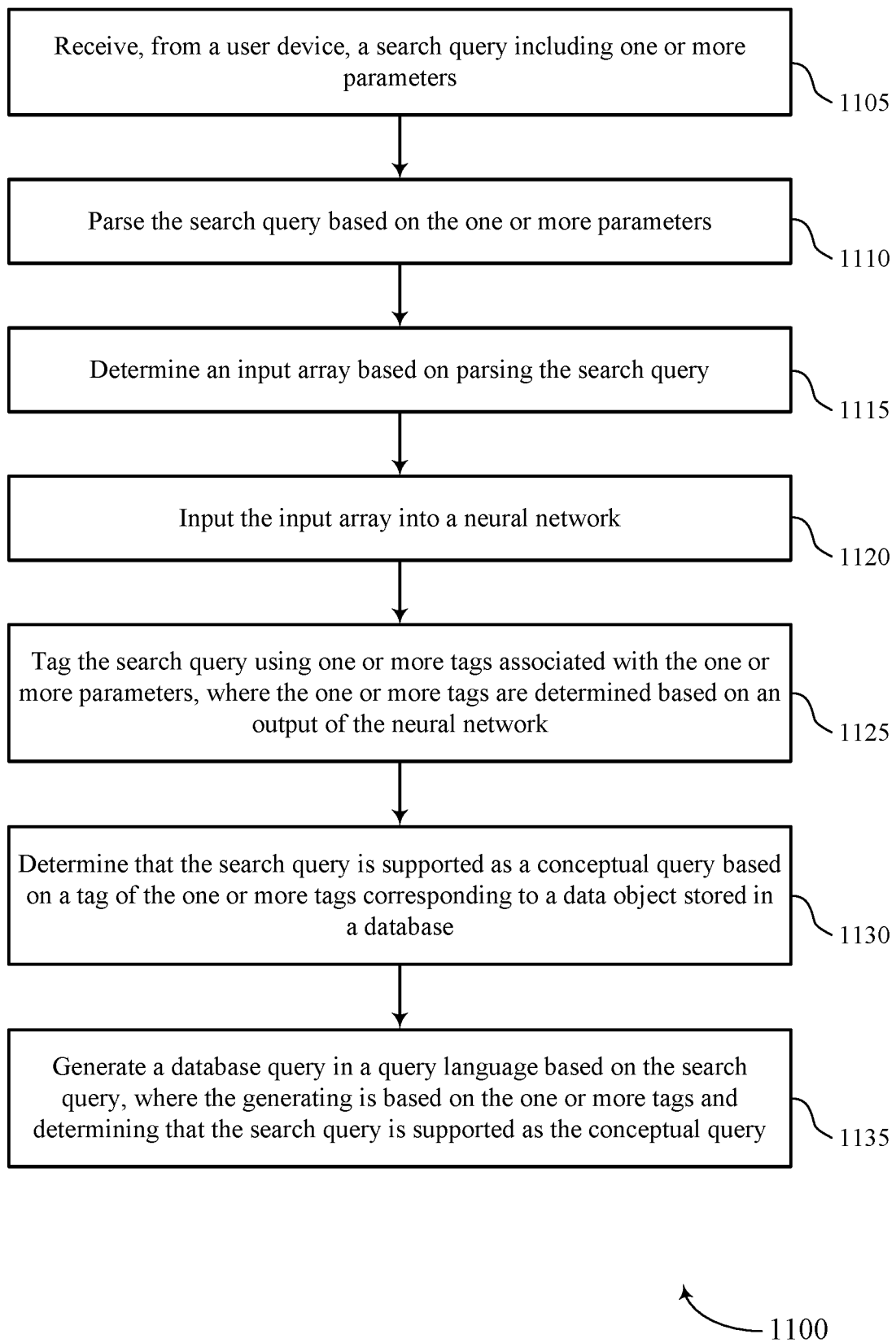

FIG. 11 shows a flowchart illustrating a method 1100 that supports detecting and processing conceptual queries in accordance with aspects of the present disclosure. The operations of method 1100 may be implemented by an application server or its components as described herein. For example, the operations of method 1100 may be performed by a query handling module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1105, the application server may receive, from a user device, a search query including one or more parameters. The operations of 1105 may be performed according to the methods described herein. In some examples, aspects of the operations of 1105 may be performed by a query receiving component as described with reference to FIGS. 7 through 9.

At 1110, the application server may parse the search query based on the one or more parameters. The operations of 1110 may be performed according to the methods described herein. In some examples, aspects of the operations of 1110 may be performed by a parsing component as described with reference to FIGS. 7 through 9.

At 1115, the application server may determine an input array based on parsing the search query. The operations of 1115 may be performed according to the methods described herein. In some examples, aspects of the operations of 1115 may be performed by an input array component as described with reference to FIGS. 7 through 9.

At 1120, the application server may input the input array into a neural network. The operations of 1120 may be performed according to the methods described herein. In some examples, aspects of the operations of 1120 may be performed by an input array component as described with reference to FIGS. 7 through 9.

At 1125, the application server may tag the search query using one or more tags associated with the one or more parameters, where the one or more tags are determined based on an output of the neural network. The operations of 1125 may be performed according to the methods described herein. In some examples, aspects of the operations of 1125 may be performed by a tagging component as described with reference to FIGS. 7 through 9.

At 1130, the application server may determine that the search query is supported as a conceptual query based on a tag of the one or more tags corresponding to a data object stored in a database. The operations of 1130 may be performed according to the methods described herein. In some examples, aspects of the operations of 1130 may be performed by a query support component as described with reference to FIGS. 7 through 9.

At 1135, the application server may generate a database query in a query language based on the search query, where the generating is based on the one or more tags and determining that the search query is supported as the conceptual query. The operations of 1135 may be performed according to the methods described herein. In some examples, aspects of the operations of 1135 may be performed by a query generation component as described with reference to FIGS. 7 through 9.

Figure 12:
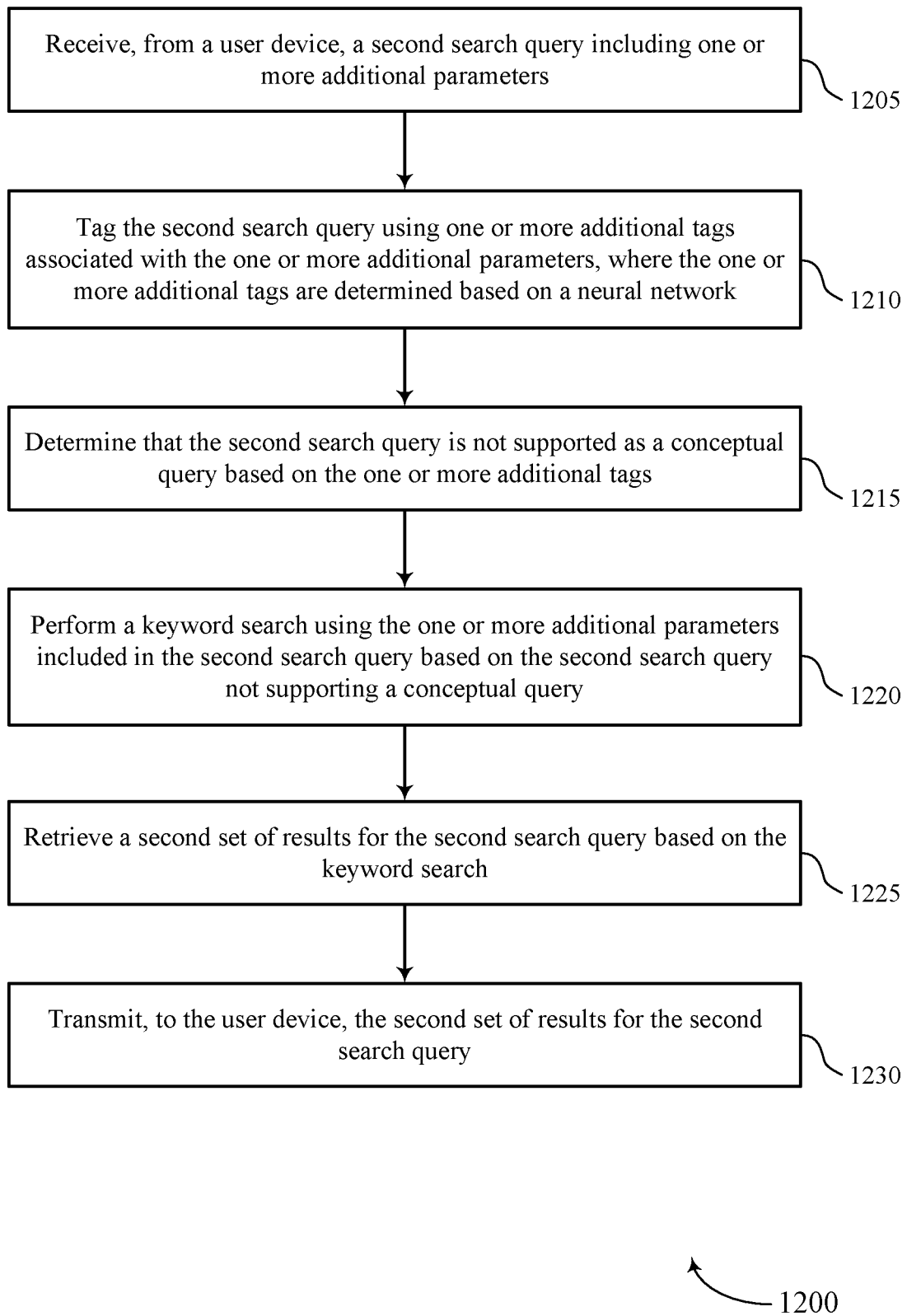

FIG. 12 shows a flowchart illustrating a method 1200 that supports detecting and processing conceptual queries in accordance with aspects of the present disclosure. The operations of method 1200 may be implemented by an application server or its components as described herein. For example, the operations of method 1200 may be performed by a query handling module as described with reference to FIGS. 7 through 9. In some examples, an application server may execute a set of instructions to control the functional elements of the application server to perform the functions described below. Additionally or alternatively, an application server may perform aspects of the functions described below using special-purpose hardware.

At 1205, the application server may receive, from a user device, a second search query including one or more additional parameters. The operations of 1205 may be performed according to the methods described herein. In some examples, aspects of the operations of 1205 may be performed by a query receiving component as described with reference to FIGS. 7 through 9.

At 1210, the application server may tag the second search query using one or more additional tags associated with the one or more additional parameters, where the one or more additional tags are determined based on a neural network. The operations of 1210 may be performed according to the methods described herein. In some examples, aspects of the operations of 1210 may be performed by a tagging component as described with reference to FIGS. 7 through 9.

At 1215, the application server may determine that the second search query is not supported as a conceptual query based on the one or more additional tags. The operations of 1215 may be performed according to the methods described herein. In some examples, aspects of the operations of 1215 may be performed by a query support component as described with reference to FIGS. 7 through 9.

At 1220, the application server may perform a keyword search using the one or more additional parameters included in the second search query based on the second search query not supporting a conceptual query. The operations of 1220 may be performed according to the methods described herein. In some examples, aspects of the operations of 1220 may be performed by a keyword search component as described with reference to FIGS. 7 through 9.

At 1225, the application server may retrieve a second set of results for the second search query based on the keyword search. The operations of 1225 may be performed according to the methods described herein. In some examples, aspects of the operations of 1225 may be performed by a results component as described with reference to FIGS. 7 through 9.

At 1230, the application server may transmit, to the user device, the second set of results for the second search query. The operations of 1230 may be performed according to the methods described herein. In some examples, aspects of the operations of 1230 may be performed by a results component as described with reference to FIGS. 7 through 9.

A method for query handling at a server is described. The method may include receiving, from a user device, a search query including one or more parameters, tagging the search query using one or more tags associated with the one or more parameters, where the one or more tags are determined based on a neural network, determining that the search query is supported as a conceptual query based on a tag of the one or more tags corresponding to a data object stored in a database, generating a database query in a query language based on the search query, where the generating is based on the one or more tags and determining that the search query is supported as the conceptual query, retrieving, from the database, a set of results for the search query using the database query in the query language, and transmitting, to the user device, the set of results for the search query.

An apparatus for query handling at a server is described. The apparatus may include a processor, memory in electronic communication with the processor, and instructions stored in the memory. The instructions may be executable by the processor to cause the apparatus to receive, from a user device, a search query including one or more parameters, tag the search query using one or more tags associated with the one or more parameters, where the one or more tags are determined based on a neural network, determine that the search query is supported as a conceptual query based on a tag of the one or more tags corresponding to a data object stored in a database, generate a database query in a query language based on the search query, where the generating is based on the one or more tags and determining that the search query is supported as the conceptual query, retrieve, from the database, a set of results for the search query using the database query in the query language, and transmit, to the user device, the set of results for the search query.

Another apparatus for query handling at a server is described. The apparatus may include means for receiving, from a user device, a search query including one or more parameters, tagging the search query using one or more tags associated with the one or more parameters, where the one or more tags are determined based on a neural network, determining that the search query is supported as a conceptual query based on a tag of the one or more tags corresponding to a data object stored in a database, generating a database query in a query language based on the search query, where the generating is based on the one or more tags and determining that the search query is supported as the conceptual query, retrieving, from the database, a set of results for the search query using the database query in the query language, and transmitting, to the user device, the set of results for the search query.

A non-transitory computer-readable medium storing code for query handling at a server is described. The code may include instructions executable by a processor to receive, from a user device, a search query including one or more parameters, tag the search query using one or more tags associated with the one or more parameters, where the one or more tags are determined based on a neural network, determine that the search query is supported as a conceptual query based on a tag of the one or more tags corresponding to a data object stored in a database, generate a database query in a query language based on the search query, where the generating is based on the one or more tags and determining that the search query is supported as the conceptual query, retrieve, from the database, a set of results for the search query using the database query in the query language, and transmit, to the user device, the set of results for the search query.

Some examples of the method, apparatuses, and non-transitory computer-readable medium described herein may further include operations, features, means, or instructions for parsing the search query based on the one or more parameters, determining an input array based on parsing the search query, and inputting the input array into the neural network.

Some examples of the method, apparatuses, and non-transitory computer-readable medium described herein may further include operations, features, means, or instructions for obtaining an output of the neural network based on inputting the input array and determining the one or more tags based on the output of the neural network, where tagging the search query using the one or more tags may be based on determining the one or more tags.

In some examples of the method, apparatuses, and non-transitory computer-readable medium described herein, parsing the search query and determining the input array further may include operations, features, means, or instructions for parsing the search query to identify one or more words and determining one or more numerical values associated with the one or more words, where the input array includes the one or more numerical values.

In some examples of the method, apparatuses, and non-transitory computer-readable medium described herein, parsing the search query and determining the input array further may include operations, features, means, or instructions for parsing the search query to identify one or more characters and determining one or more numerical values associated with the one or more characters, where the input array includes the one or more numerical values.

Some examples of the method, apparatuses, and non-transitory computer-readable medium described herein may further include operations, features, means, or instructions for determining that a first tag and a second tag may be associated with a parameter included in the search query and combining the first tag and the second tag associated with the parameter, where tagging the search query may be based on combining the first tag and the second tag.

Some examples of the method, apparatuses, and non-transitory computer-readable medium described herein may further include operations, features, means, or instructions for determining that at least one parameter from the one or more parameters includes at least one of a name of a person, a name of an organization, or a combination thereof and resolving the at least one parameter to a unique identifier associated with at least one of the person, the organization, or a combination thereof.

In some examples of the method, apparatuses, and non-transitory computer-readable medium described herein, resolving the at least one parameter further may include operations, features, means, or instructions for querying a search index database based on the at least one parameter and receiving, from the search index database, the unique identifier based on the querying.

Some examples of the method, apparatuses, and non-transitory computer-readable medium described herein may further include operations, features, means, or instructions for identifying a set of data object types stored in the database based on a configured list of data object types supported by the database and determining the tag of the one or more tags corresponding to the data object stored in the database based on identifying the set of data object types.

Some examples of the method, apparatuses, and non-transitory computer-readable medium described herein may further include operations, features, means, or instructions for retrieving, from the database, information indicating the set of data object types supported by the database and configuring the configured list of data object types based on the retrieved information indicating the set of data object types supported by the database.

Some examples of the method, apparatuses, and non-transitory computer-readable medium described herein may further include operations, features, means, or instructions for determining metadata based on the one or more tags associated with the one or more parameters and generating at least one of the database query in the query language, the set of results for the search query, or a combination thereof based on the metadata.

Some examples of the method, apparatuses, and non-transitory computer-readable medium described herein may further include operations, features, means, or instructions for receiving, from the user device, a second search query including one or more additional parameters, tagging the second search query using one or more additional tags associated with the one or more additional parameters, where the one or more additional tags may be determined based on the neural network, determining that the second search query may be not supported as a second conceptual query based on the one or more additional tags, performing a keyword search using the one or more additional parameters included in the second search query based on the second search query not supporting the second conceptual query, retrieving a second set of results for the second search query based on the keyword search, and transmitting, to the user device, the second set of results for the second search query.

Some examples of the method, apparatuses, and non-transitory computer-readable medium described herein may further include operations, features, means, or instructions for updating the neural network based on identifying one or more pre-tagged queries, receiving an update to the database, or both, where the one or more tags may be determined based on updating the neural network.

In some examples of the method, apparatuses, and non-transitory computer-readable medium described herein, tagging the search query using the one or more tags may include operations, features, means, or instructions for tagging the search query using the one or more tags according to an IOB format.

Some examples of the method, apparatuses, and non-transitory computer-readable medium described herein may further include operations, features, means, or instructions for identifying at least one of an entity, a scope, a time period, a field value, or a combination thereof based on the one or more tags, where generating the database query in the query language may be based on the identifying.

In some examples of the method, apparatuses, and non-transitory computer-readable medium described herein, the neural network includes a Named Entity Recognition system.

Some examples of the method, apparatuses, and non-transitory computer-readable medium described herein may further include operations, features, means, or instructions for formatting the set of results for the search query for display in a user interface of the user device.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for query handling at a server, comprising:
   receiving, from a user device, a search query associated with a user, the search query comprising one or more parameters;
   parsing the search query to generate a first array comprising a first set of numerical values corresponding to one or more words from the one or more parameters and to generate a second array comprising a second set of numerical values corresponding to one or more characters from the one or more words;
   inputting the first array and the second array into a machine learned neural network to generate one or more tags, wherein the machine learned neural network is trained on information stored in a database supported by the server;
   filtering a first subset of data objects from the one or more data objects using a first parameter of the one or more parameters according to a first filter;
   filtering a second subset of data objects from the first subset of data objects using a second parameter of the one or more of the parameters according to a second filter;
   determining that the search query is supported as a conceptual query based at least in part on a tag of the one or more tags corresponding to the one or more data objects stored in the database, wherein the conceptual query comprises a natural language query including information for filtering the one or more data objects in the database;
   generating a database query in a query language based at least in part on the search query, wherein the generating is based at least in part on the one or more tags and determining that the search query is supported as the conceptual query;
   retrieving, from the database, a set of results for the search query using the database query in the query language; and
   causing for display, at the user device, the set of results for the search query.

2. The method of claim 1, further comprising:
   obtaining an output of the machine learned neural network based at least in part on inputting the first array and the second array; and
   determining the one or more tags based at least in part on the output of the machine learned neural network.

3. The method of claim 1, wherein parsing the search query further comprises:
   parsing the search query to identify the one or more words; and
   determining the first array of one or more numerical values corresponding to the one or more words.

4. The method of claim 1, wherein parsing the search query further comprises:
   parsing the search query to identify the one or more characters; and
   determining the second array of one or more numerical values corresponding to the one or more characters.

5. The method of claim 1, further comprising:
   determining that a first tag and a second tag are associated with a parameter included in the search query; and
   combining the first tag and the second tag associated with the parameter.

6. The method of claim 1, further comprising:
   determining that at least one parameter from the one or more parameters includes at least one of a name of a person, a name of an organization, or a combination thereof; and
   resolving the at least one parameter to a unique identifier associated with at least one of the person, the organization, or a combination thereof.

7. The method of claim 6, wherein resolving the at least one parameter further comprises:
   querying a search index database based at least in part on the at least one parameter; and
   receiving, from the search index database, the unique identifier based at least in part on the querying.

8. The method of claim 1, further comprising:
   identifying a plurality of data object types stored in the database based at least in part on a configured list of data object types supported by the database; and
   determining the tag of the one or more tags corresponding to the one or more data objects stored in the database based at least in part on identifying the plurality of data object types.

9. The method of claim 8, further comprising:
   retrieving, from the database, information indicating the plurality of data object types supported by the database; and
   configuring the configured list of data object types based at least in part on the retrieved information indicating the plurality of data object types supported by the database.

10. The method of claim 1, further comprising:
    determining metadata based at least in part on the one or more tags associated with the one or more parameters; and
    generating at least one of the database query in the query language, the set of results for the search query, or a combination thereof based at least in part on the metadata.

11. The method of claim 1, further comprising:
    receiving, from the user device, a second search query comprising one or more additional parameters;
    tagging the second search query using one or more additional tags associated with the one or more additional parameters, wherein the one or more additional tags are determined based at least in part on the machine learned neural network;
determining that the second search query is not supported as a second conceptual query based at least in part on the one or more additional tags;
performing a keyword search using the one or more additional parameters included in the second search query based at least in part on the second search query not supporting the second conceptual query;
retrieving a second set of results for the second search query based at least in part on the keyword search; and
transmitting, to the user device, the second set of results for the second search query.

12. The method of claim 1, further comprising:
updating the machine learned neural network based at least in part on identifying one or more pre-tagged queries, receiving an update to the database, or both, wherein the one or more tags are determined based at least in part on updating the machine learned neural network.

13. The method of claim 1, further comprising:
tagging the search query using the one or more tags according to an Inside Outside Beginning (JOB) format.

14. The method of claim 1, further comprising:
identifying at least one of an entity, a scope, a time period, a field value, or a combination thereof based at least in part on the one or more tags, wherein generating the database query in the query language is based at least in part on the identifying.

15. The method of claim 1, wherein the machine learned neural network comprises a Named Entity Recognition system.

16. The method of claim 1, further comprising:
formatting the set of results for the search query for display in a user interface of the user device.

17. An apparatus for query handling at a server, comprising: a processor; memory in electronic communication with the processor; and instructions stored in the memory and executable by the processor to cause the apparatus to:
receive, from a user device, a search query associated with a user, the search query comprising one or more parameters;
parse the search query to generate a first array comprising a first set of numerical values corresponding to one or more words from the one or more parameters and to generate a second array comprising a second set of numerical values corresponding to one or more characters from the one or more words;
input the first array and the second array into a machine learned neural network to generate one or more tags, wherein the machine learned neural network is trained on information stored in a database supported by the server;
filter a first subset of data objects from the one or more data objects using a first parameter of the one or more parameters according to a first filter;
filter a second subset of data objects from the first subset of data objects using a second parameter of the one or more of the parameters according to a second filter;
determine that the search query is supported as a conceptual query based at least in part on a tag of the one or more tags corresponding to the one or more data objects stored in the database, wherein the conceptual query comprises a natural language query including information for filtering the one or more data objects in the database;
generate a database query in a query language based at least in part on the search query, wherein the generating is based at least in part on the one or more tags and determining that the search query is supported as the conceptual query;
retrieve, from the database, a set of results for the search query using the database query in the query language; and
cause for display, at the user device, the set of results for the search query.

18. A non-transitory computer-readable medium storing code for query handling at a server, the code comprising instructions executable by a processor to:
receive, from a user device, a search query associated with a user, the search query comprising one or more parameters;
parse the search query to generate a first array comprising a first set of numerical values corresponding to one or more words from the one or more parameters and to generate a second array comprising a second set of numerical values corresponding to one or more characters from the one or more words;
input the first array and the second array into a machine learned neural network to generate one or more tags, wherein the machine learned neural network is trained on information stored in a database supported by the server;
filter a first subset of data objects from the one or more data objects using a first parameter of the one or more parameters according to a first filter;
filter a second subset of data objects from the first subset of data objects using a second parameter of the one or more of the parameters according to a second filter;
determine that the search query is supported as a conceptual query based at least in part on a tag of the one or more tags corresponding to the one or more data objects stored in the database, wherein the conceptual query comprises a natural language query including information for filtering the one or more data objects in the database;
generate a database query in a query language based at least in part on the search query, wherein the generating is based at least in part on the one or more tags and determining that the search query is supported as the conceptual query;
retrieve, from the database, a set of results for the search query using the database query in the query language; and
cause for display, at the user device, the set of results for the search query.

* * * * *